(12) United States Patent
Shimamura et al.

(10) Patent No.: US 10,877,451 B2
(45) Date of Patent: Dec. 29, 2020

(54) CONTROL DEVICE

(71) Applicant: OMRON Corporation, Kyoto (JP)

(72) Inventors: Junji Shimamura, Takatsuki (JP);
Tetsushi Jakunen, Kusatsu (JP);
Tomonori Shimamura, Otsu (JP); Eiji Yamamoto, Kyoto (JP); Masahiko Nakano, Ritto (JP)

(73) Assignee: OMRON Corporation, Kyoto (JP)

( * ) Notice: Subject to any disclaimer, the term of this patent is extended or adjusted under 35 U.S.C. 154(b) by 290 days.

(21) Appl. No.: 16/005,683

(22) Filed: Jun. 12, 2018

(65) Prior Publication Data

US 2019/0101881 A1    Apr. 4, 2019

(30) Foreign Application Priority Data

Sep. 29, 2017    (JP) ................................ 2017-190344

(51) Int. Cl.
*G05B 19/042*    (2006.01)
*G05B 19/418*    (2006.01)
(Continued)

(52) U.S. Cl.
CPC .......... *G05B 19/0426* (2013.01); *B25J 9/163* (2013.01); *G05B 19/0421* (2013.01); *G05B 19/05* (2013.01); *G05B 19/418* (2013.01); *G05B 19/4155* (2013.01); *G05B 19/41815* (2013.01); *G05B 19/414* (2013.01); *G05B 2219/25482* (2013.01); *G05B 2219/31261* (2013.01); *G06F 9/544* (2013.01); *G06F 13/1663* (2013.01)

(58) Field of Classification Search
None
See application file for complete search history.

(56) References Cited

U.S. PATENT DOCUMENTS

| | | | |
|---|---|---|---|
| 5,815,399 A | 9/1998 | Fujibayashi et al. | |
| 2012/0239172 A1* | 9/2012 | Nishiyama | G05B 19/05 700/86 |

(Continued)

FOREIGN PATENT DOCUMENTS

| | | |
|---|---|---|
| EP | 0181944 | 5/1986 |
| EP | 2685377 | 1/2014 |

(Continued)

OTHER PUBLICATIONS

"Search Report of Europe Counterpart Application", dated Feb. 5, 2019, p. 1-p. 8.

*Primary Examiner* — Qing Yuan Wu
(74) *Attorney, Agent, or Firm* — JCIPRNET

(57) ABSTRACT

The present disclosure provides a configuration of a control device that is capable of controlling the execution timing, etc. of multiple application programs when the multiple programs are executed in parallel in addition to a sequence program in a single control device. In the control device, when a first application program includes a first special command and a second application program includes a second special command, a command calculation part outputs a control command according to commands described after the first special command in the first application program and a control command according to commands described after the second special command in the second application program on the basis of a common timing.

6 Claims, 16 Drawing Sheets

(51) Int. Cl.
*G05B 19/05* (2006.01)
*G05B 19/4155* (2006.01)
*G05B 19/414* (2006.01)
*G06F 13/16* (2006.01)
*G06F 9/54* (2006.01)
*B25J 9/16* (2006.01)

(56) References Cited

U.S. PATENT DOCUMENTS

| | | | |
|---|---|---|---|
| 2013/0018485 A1* | 1/2013 | Stoddard | B25J 9/1669 700/14 |
| 2014/0207254 A1* | 7/2014 | Nishiyama | G05B 19/04 700/11 |
| 2016/0291556 A1* | 10/2016 | Shimamura | G06F 9/4887 |

FOREIGN PATENT DOCUMENTS

| | | |
|---|---|---|
| JP | S60245002 | 12/1985 |
| JP | H01280804 | 11/1989 |
| JP | H06149329 | 5/1994 |
| JP | H08234820 | 9/1996 |
| JP | 2003228418 | 8/2003 |
| JP | 2011062798 | 3/2011 |
| JP | 2014241018 | 12/2014 |
| JP | 2016194831 | 11/2016 |

* cited by examiner

CONTROL DEVICE

CROSS-REFERENCE TO RELATED APPLICATION

This application claims the priority benefit of Japan application serial no. 2017-190344, filed on Sep. 29, 2017. The entirety of the above-mentioned patent application is hereby incorporated by reference herein and made a part of this specification.

BACKGROUND OF THE INVENTION

Field of the Invention

The disclosure relates to a control device for controlling a control object.

Description of Related Art

Various FA (Factory Automation) technologies have been widely used in production sites. Such FA systems include not only a control device such as a PLC (Programmable Logic Controller) but also various actuators that are capable of performing advanced operations such as CNC (Computer Numerical Control) and robot. Such FA systems tend to be larger in scale.

For example, Japanese Patent Laid-Open No. 2016-194831 (Patent Document 1) discloses a control device that is capable of easily attaining synchronization between control programs when the control of multiple motors is performed by executing multiple control programs in parallel. Patent Document 1 discloses a configuration that at the timing of starting execution of a control program 1 and a control program 2, axis variables of the control program 1 preceding the timing are passed to the control program 2. That is, even if the axis variables of the control program 1 are updated before the execution of the control program 2, the updated variables will not be passed to the control program 2.

In a system that controls a robot, etc., a method that shares a memory between multiple processors may be adopted.

For example, Japanese Patent Laid-Open No. 2011-062798 (Patent Document 2) discloses a robot system including a robot CPU and a PLC having a CPU. In this robot system, when instruction information defined by the location within an I/O area that inputs/outputs data and the data written at the location is received from an instruction transmission apparatus operated by a pre-determined program language, the robot CPU makes the robot perform the motion corresponding to the instruction information based on the definition. In the robot system disclosed in Patent Document 2, the data in the I/O area is shared between the PLC and the robot CPU.

Japanese Patent Laid-Open No. H01-280804 (Patent Document 3) discloses a configuration for a control device including a Numerical Controller (NC) and a PLC connecting to the NC that has a memory shared with the PLC in the NC.

Japanese Patent Laid-Open No. 2003-228418 (Patent Document 4) discloses a control device for an industrial robot (RC) that has a dual port random access memory accessible from both the RC and a PLC.

Japanese Patent Laid-Open No. H06-149329 (Patent Document 5) discloses a robot controller that is used by attaching to a NC machining tool. In the controller, when a transfer operation of a robot program is input from an operation panel, the robot program is written into a shared RAM from a program storing RAM, and a CPU recognizes the robot program and registers it into a robot program storing RAM. Then, when a robot program operation is performed through the operation panel, the robot program operation command is written into the shared RAM, and the CPU recognizes the command and instructs the robot by reading the robot program registered in the robot program storing RAM so that the robot program operation is performed.

In addition, there exists technology to insert codes for controlling program execution itself into an application program.

Japanese Patent Laid-Open No. H08-234820 (Patent Document 6) discloses a simultaneous operation command method by a NC program that makes multiple actuators operate simultaneously. In the simultaneous operation command method, a command to start a simultaneous operation of multiple general-purpose M codes and a command to terminate the simultaneous operation are set as special M codes, and a NC program is created by arranging the special M code to start the simultaneous operation immediately before the lines of the multiple general-purpose M codes to be operated simultaneously, and arranging the special M code to terminate the simultaneous operation immediately after the lines. When the program is executed, after the simultaneous operation is started, the general-purpose M codes are stored one by one and immediately executed without waiting for operation confirmation from the actuators until the instruction to terminate the simultaneous operation is appeared.

Japanese Patent Laid-Open No. S60-245002 (Patent Document 7) discloses a device that numerically controls a machining tool according to a predetermined program depending on control from a central processing device. This device includes a timer that operates for a period of time specified by a command for a dwell execution when the command is received from the central processing device and a means to instruct the end of the dwell execution externally. The device performs a skip with respect to the dwell by putting the machining tool into the standby state and performing the dwell execution while the timer is operating, and by releasing the operation standby of the machining tool and terminating the dwell when the timer finishes operating or a dwell termination instruction is received.

Further, Japanese Patent Laid-Open No. 2014-241018 (Patent Document 8) discloses a control device that controls both a machining tool and a robot by a single machining program.

The processing capability of control devices has also been dramatically improving along with the recent progress of ICT (Information and Communication Technology). In conventional technology, a configuration that controls a NC machining tool or a robot by a dedicated control device independent from a PLC is common. However, there are needs for including the control of these in the PLC. Also, there are needs for improving production efficiency by more accurately synchronizing the sequence control, the motion control, the control for the NC machining tool and the control for the robot. Conventional technology is unable to sufficiently satisfy these needs.

Patent Document 1 described before discloses that the synchronization between control devices is realized by passing axis variables of a control program to the other control program when performing control of multiple motors in parallel by multiple control programs without mentioning about the NC machining tool or the robot. Also, Patent Document 1 only discloses the axis variables passed from one control program to the other control program, and does not disclose a method to synchronize both control programs by code unit.

In Patent Documents 2 to 5, sharing data between multiple controllers or multiple processors is assumed, and execution of multiple processes by a single control device is not considered at all.

In Patent Document 6, controlling simultaneous operations in the NC machining tool by using the control device is assumed, and execution of multiple processes by a single control device is not considered at all.

Patent Document 7 merely discloses a dwell operation in a program, and does not disclose synchronous execution between multiple programs at all.

Patent Document 8 merely discloses that a single machining program is divided into a program for the machining tool and a program for the robot, and does not disclose synchronous execution between the machining tool and the robot at all.

The present disclosure provides a configuration that is capable of easily controlling the execution timing of multiple application programs, etc. when multiple application programs are simultaneously executed in addition to a sequence program in a single control device.

SUMMARY

According to an embodiment of the disclosure, a control device includes a storage part that stores a first application program and a second application program to be sequentially executed and a sequence program. Each of the first application program and the second application program includes one or more commands. The control device includes a program execution part that executes the sequence program and outputs a control command at every control cycle; an parsing part that parses at least a part of the first application program and sequentially generates a first internal command at every first cycle that is the same as or longer than the control cycle and parses at least a part of the second application program and sequentially generates a second internal command at every second cycle that is the same as or longer than the control cycle; a shared memory that stores the first internal command and the second internal command generated by the parsing part; and a command calculation part that outputs respective control commands at every control cycle according to the first internal command and the second internal command. When the first application program includes the first special command and the second application program includes the second special command corresponding to the first special command, the command calculation part outputs a control command according to commands described after the first special command in the first application program and a control command according to commands described after the second special command in the second application program on the basis of a common timing.

DESCRIPTION OF THE PRESENT EMBODIMENTS

Figure 1:
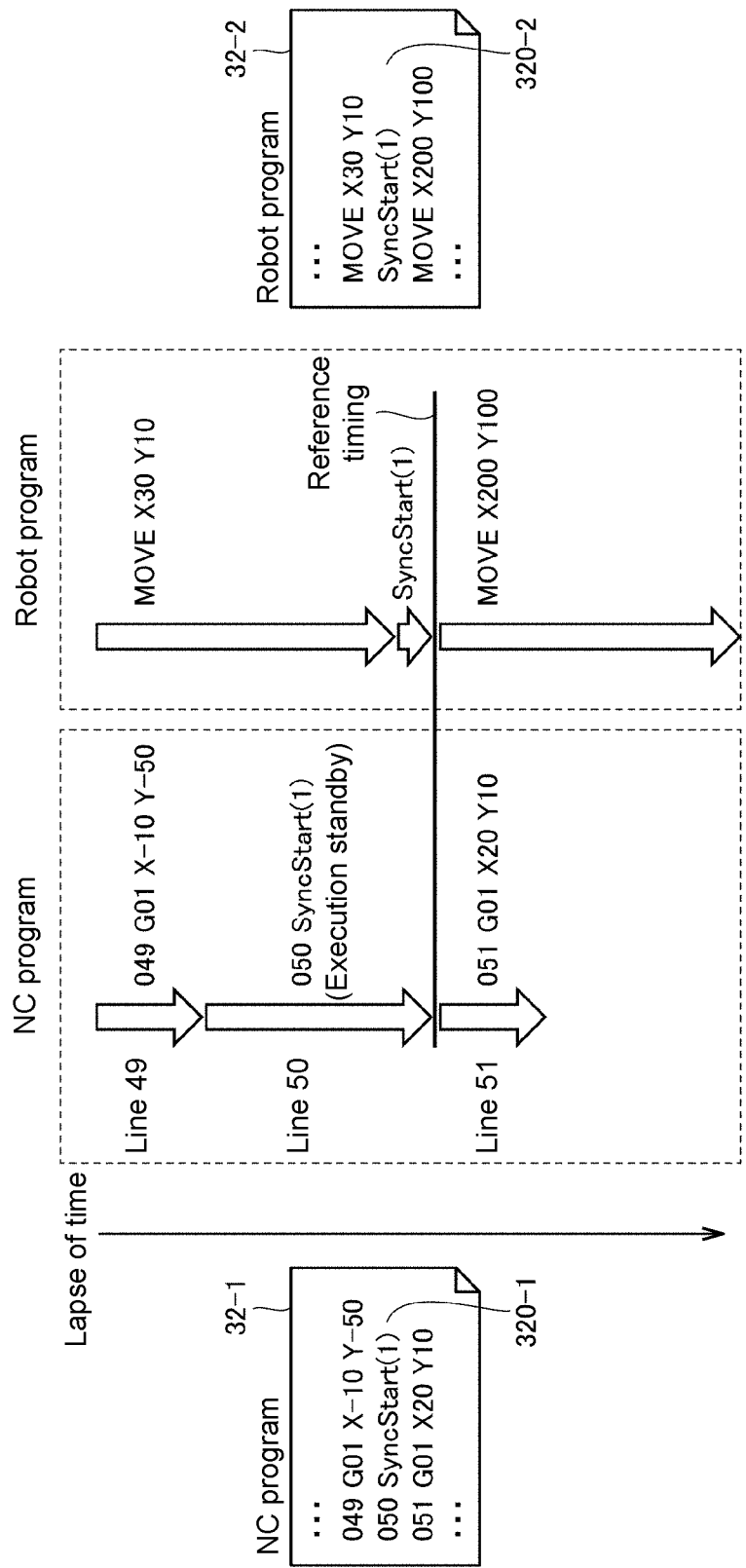
FIG. 1 is a schematic diagram for describing an execution example of application programs in the control device according to the embodiment.

According to the disclosure, in parallel execution of multiple application programs in a single control device, the user only adds special codes corresponding to each application program so that respective control commands according to commands described after the special code can be output on the basis of the common timing. By using the output on the basis of such a common timing, multiple control applications can be operated in coordination with each other. The production efficiency of production facilities can be improved and thus the productivity can be improved by such a coordinated operation.

According to the disclosure, the control device may include an arbitration part that detects the execution completion of the commands up to the one described immediately before the first special command and the execution completion of the commands up to the one described immediately before the second special command and notifies the parsing part of the common timing.

According to the disclosure, the parsing part itself does not need to perform the timing management based on the special command, and the functional configuration of the control device can be simplified and independent.

According to an embodiment of the disclosure, the first special command and the second special command may include an instruction for simultaneously outputting control commands according to commands described after the first special command and control commands according to commands described after the second special command at the common timing.

According to the disclosure, the synchronization can be realized with the accuracy of the control cycle in applications in which multiple control applications are operated simultaneously.

According to an embodiment of the disclosure, the first special command may include an instruction for outputting control commands according to commands described after the first special command after a specified period of time has passed from the common timing.

According the disclosure, a time difference can be managed with the accuracy of the control cycle in applications in which multiple control applications are operated in parallel with maintaining an arbitrary time difference.

According to an embodiment of the disclosure, a variable that is updated by the sequence program may be specified as an execution start condition for the first application program and the second application program.

According to the disclosure, synchronization and coordination between facilities controlled by the sequence program and control applications controlled by the application programs can be realized more flexibly.

According to an embodiment of the disclosure, in the first and second special commands, an argument that makes the first and second special commands correspond to each other may be specified in addition to a command body.

According to the disclosure, time and effort on the programming can be reduced since it is only required to specify the argument even in the case where it is necessary to describe multiple special commands in each application program.

According to an embodiment of the disclosure, when internal commands are generated from commands described in the first application program and the second application program, the parsing part may also refer to commands described after the commands from which the internal command are generated.

According to the disclosure, when the internal commands are generated from the application programs, accuracy of the generated internal commands can be improved. Also, when the internal commands indicate a trajectory, a smoother trajectory can be realized.

According to an embodiment of the disclosure, the parsing part parses the application programs at every predetermined operation cycle, and inhibits writing to the shared memory for a period of time that is from the start to the completion of the parse at every execution cycle.

According to the disclosure, it can be prevented that variables shared between the application programs and the sequence program are modified during the processing.

According to the present invention, when multiple application programs are executed in parallel in addition to the sequence program in a single control device, the execution timing, etc. of the multiple application programs can be easily controlled.

Embodiments of the disclosure are described in detail with reference to the drawings. The same reference numeral is assigned to the same or corresponding part in the drawings, and the description thereof is omitted.

A. Application Example

Firstly, an example of the situation to which the disclosure is applied is described. A control device 100 according to the disclosure executes a sequence program and multiple application programs. Since these programs are arbitrarily created by a user according to the control target, the sequence program and the one or more application programs may be collectively referred to as "user programs" for convenience in the description below.

In this description, the "sequence program" is a concept that covers a program that is scanned entirely in each execution and from which one or more command values are calculated in each execution. The "sequence program" includes a program composed of one or more instructions described according to the international standard IEC61131-3 defined by the International Electrotechnical Commission (IEC). The "sequence program" may include a sequence instruction and/or a motion instruction. The "sequence program" may include not only instructions described according to the international standard IEC61131-3 but also instructions privately defined by a manufacturer or a vendor, etc. of the PLC. The "sequence program" is suitable for controls requiring immediacy and high speed.

In this description, a "sequence instruction" is basically a term that covers one or more instructions described by one or more logic circuits calculating input values, output values, internal values, etc. Basically, in a single control cycle, the "sequence instruction" is executed from the beginning to the end, and in the next control cycle, the "sequence instruction" is again executed from the beginning to the end.

In this description, a "motion instruction" is a term that covers one or more instructions for calculating numerical values such as position, speed, acceleration, jerk, angle, angular speed, angular acceleration, angular jerk, etc. as commands for an actuator such as a servo motor. Similarly, regarding the "motion instruction", a program of the motion instruction (motion program) described by a function block or a numerical value calculation formula is executed from the beginning to the end in a single control cycle. That is, the command values are calculated (updated) at every control cycle.

A control command that is output by executing a sequence program at every control cycle includes on/off of a digital output determined according to the sequence instruction and an analog output calculated according to the motion instruction.

In this description, an "application program" includes any program that is executed sequentially. Typically, the "application program" includes any program that is described in any language executable in an interpreter system which sequentially executes the program line by line. The "application program" is described with one or more commands.

An example of such an "application program" is a program for controlling a NC machining tool (also referred to as "NC program" hereinafter). The NC machining tool typically includes a machining apparatus such as a lathe machining apparatus, a milling machine and an electric discharge machining apparatus.

Another example of the "application program" is a program for controlling a robot. The robot typically includes an articulated robot and a scalar type robot.

The NC program is described according to a predetermined language. As an example, the NC program is described using "G language", and the program for controlling a robot is often described using a dedicated robot language (a command group referred to as "M language", for example).

In the description below, for example, an apparatus or a machine, including the control thereof, performing a specific machining or operation using a NC machining tool and/or a robot may be referred to as "control application".

For each application program, the control device 100 sequentially generates internal commands by parsing at least a part of the application program at every application execution cycle which is the same as the control cycle or is longer than the control cycle, and outputs a control command at every control cycle according to the internal command.

The application program executed sequentially is not suited for processing that outputs a control command at every constant cycle, so the internal command which is suited for outputting a control command at every control cycle is generated. Such an internal command may be any codes that can output a control command at every control cycle. Typically, the internal command may be one or more functions taking time as an input variable, or one or more instructions taking time as an argument.

When multiple application programs are executed in the control device 100, the control device 100 sequentially generates the first internal command by parsing at least a part of the first application program at every first cycle (application execution cycle T21) which is the same as the control cycle or is longer than the control cycle, and sequentially generates the second internal command by parsing of at least a part of the second application program at every second cycle (application execution cycle T22) which is the same as the control cycle or is longer than the control cycle. Then, the control device 100 outputs the respective control commands at every control cycle according to the first and second internal commands.

For example, a control application for arranging a work inside a NC machining tool and taking out the work treated by the NC machining tool by using a robot is assumed. In such a control application, in an embodiment, the operation timing of the robot and the operation timing of the NC machining tool are coordinated. For example, a waiting time for the start of the NC machining tool's operation can be reduced by starting the operation of the NC machining tool immediately after the arrangement of the work is completed by the robot, or a waiting time for the processing start for the next work can be reduced by taking out the treated work by the robot immediately after the treatment in the NC machining tool is completed.

The control device 100 according to the embodiment can more precisely control the operation timing of such apparatuses which are respectively controlled by different application programs.

FIG. 1 is a schematic diagram for describing an execution example of application programs in the control device 100 according to the embodiment. In FIG. 1, a NC program and a robot program are assumed as an example of multiple application programs 31-1 and 31-2.

Referring to FIG. 1, commands for defining necessary operations according to G language are described in the NC program. When the NC program is being executed, each of the commands is sequentially executed. Similarly, commands for defining necessary operations are described in the robot program. When the robot program is being executed, each of the commands is sequentially executed.

The application program 32-1 shown in FIG. 1 includes a special command 320-1 that is "SyncStart(1)" at line 50, in addition to commands defining normal operations. The application program 32-2 also includes a special command 320-2 that is "SyncStart(1)", in addition to commands defining normal operations.

The special commands 320-1 and 320-2 are associated with each other. When such a special command is found in an application program, based on the corresponding special command in the other application program, the control device 100 outputs control commands according to the two application programs.

That is, each of the special commands described in multiple application programs instructs to output control commands according to commands described after each of the special commands on the basis of a common timing. In the example illustrated in FIG. 1, the execution of commands after the special command 320-1 of the application program 32-1 and commands after the special command 320-2 of the application program 32-2 starts on the basis of the common timing. In this way, the control device 100 performs the arbitration processing for the application programs which executes respective commands among the application programs on the basis of the common timing.

As shown in FIG. 1, for example, in the case where the special command 320-1 is described in line 50 of the application program 32-1, when the command immediately before (that is, in line 49) is executed, the execution status of the corresponding special command 320-2 in the application program 32-2 is confirmed. FIG. 1 shows the example in which the execution of the command described immediately before the special command 320-2 included in the application program 32-2 is later than the completion of the execution of the command in line 49 of the application program 32-1. Thus, the special command 320-1 is synonymous with the instruction to wait the completion of the execution of the command described immediately before the special command 320-2 described in the application program 32-2.

When the execution of the command described immediately before the special command 320-2 included in the application program 32-2 is completed, the execution of the commands after the special command 320-1 of the application program 32-1 and of the commands after the special command 320-2 of the application program 32-2 are started on the basis of the common timing.

In the example illustrated in FIG. 1, the execution of the command "G01 X20 Y10" described after the special command 320-1 of the application program 32-1 and of the command "MOVE X200 Y100" described after the special command 320-2 of the application program 32-2 are started simultaneously on the basis of the common timing.

FIG. 1 shows the example in which the execution of the commands up to the special command 320-1 described in the application program 32-1 is earlier than the execution of the commands up to the special command 320-2 described in the application program 32-2, and the similar operation is performed in the opposite case.

That is, when the execution of the commands up to the special command 320-2 described in the application program 32-2 is earlier than the execution of the commands up to the special command 320-1 described in the application program 32-1, the special command 320-2 is synonymous with the instruction to wait the completion of the execution of the command described immediately before the special command 320-1 described in the application program 32-1.

In this description, the expression, "outputs the control commands on the basis of the common timing", includes the case where the output of a control command according to each command of the subject application programs is started on the basis of the common timing and after respective offset time has passed, in addition to the case where the output of a control command according to each command of the subject application programs is started on the basis of the common timing. For example, the execution of a command that is subject to the application program 32-1 may be started when the common timing is arrived, and the execution of a command that is subject to the application program 32-2 may be started when a predetermined offset time from the common timing has passed. By using such an offset time, multiple control applications can be operated in parallel while the execution timing is shifted for a predetermined time. By setting such an offset time, for example, a parallel operation that takes a period of time required for the robot to move to the NC machining tool into consideration is easily realized.

For convenience of explanation, the same code is used for the special command 320-1 and the special command 320-2 in FIG. 1, but it is not limited thereto. Any codes may be used as long as these can be associated with each other. For example, codes conforming to each language format may be used as the special commands. It is easier for the developers of the respective programs to use the special commands by adopting special commands conforming to the language format of each application program.

FIG. 1 describes the case of two application programs, but, by describing special commands to each of three or more application programs, a control command according to each command described after each of the special commands can be output on the basis of the common timing among the three or more subject application programs.

Also, multiple different application programs and special commands corresponding to each of these application programs may be described in a single application program.

As described above, when a single control device 100 executes multiple application programs, by describing a special command corresponding to each of the application programs, control commands according to commands described after the special command in each of the application programs can be output on the basis of the common timing. By outputting control commands according to commands described in each of the application programs on the basis of the common timing, the coordinated operation can be controlled more accurately when multiple actuators or apparatuses are operated in cooperation. That is, since the coordinated operation can be controlled in a unit of the control cycle of the control device 100, the wait time, etc. can be reduced and, thereby, the production efficiency can be improved compared to the conventional technologies.

More detailed configuration and operation of the control device 100 according to the disclosure is described below as a concrete application example.

B. Example of Overall Configuration of Control System

Figure 2:
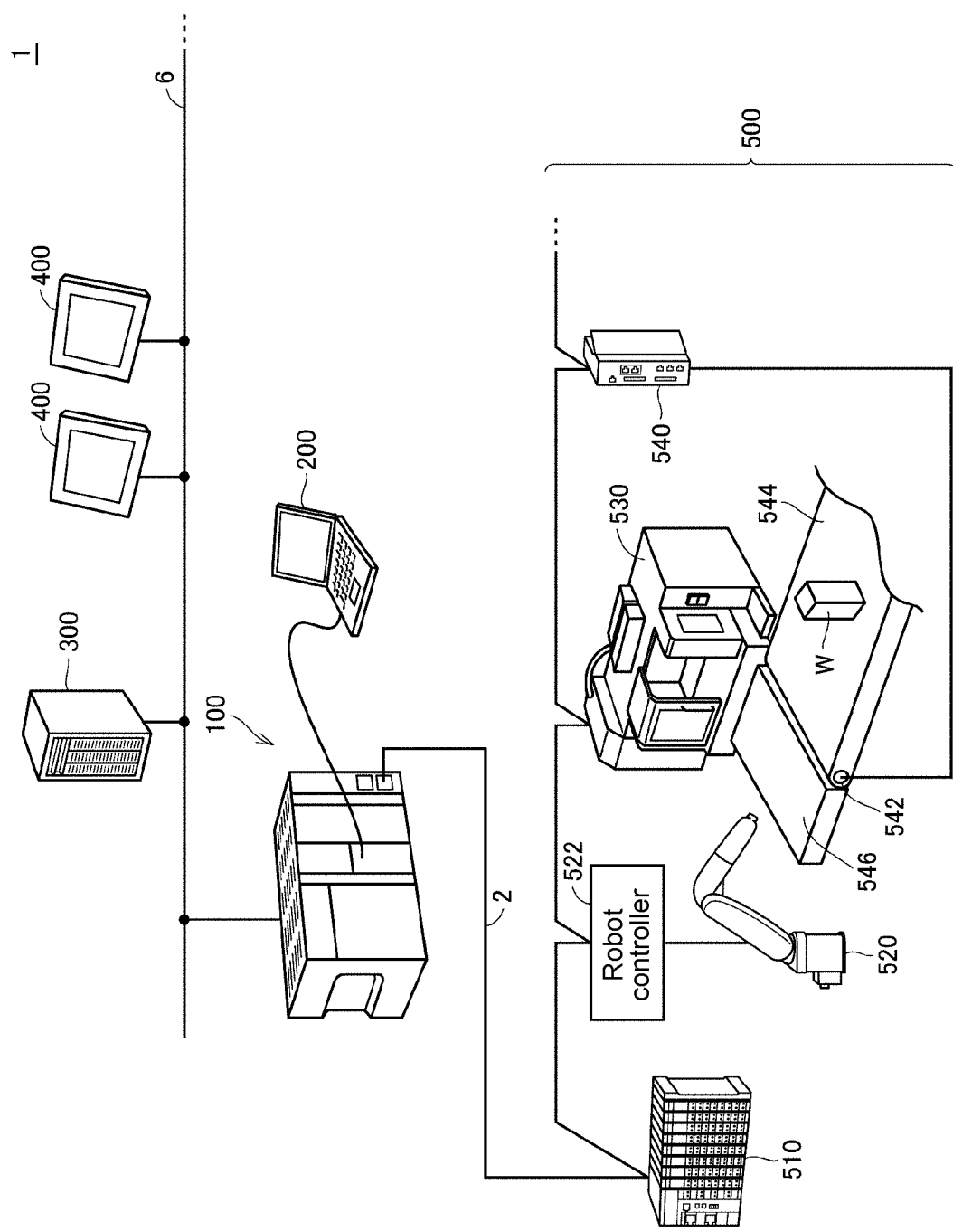
FIG. 2 is a schematic diagram illustrating an example of the overall configuration of the control device according to the embodiment.

Firstly, the overall configuration of a control system 1 including the control device 100 according to the disclosure is described. FIG. 2 is a schematic diagram illustrating the overall configuration of the control system 1 according to the embodiment. FIG. 2 illustrates the control system 1 which is centered on the control device 100 according to the embodiment.

Referring to FIG. 2, the control device 100 corresponds to an industrial controller that controls control targets, such as various instruments and apparatuses. The control device 100 is a type of computer performing control operations described later and may typically be realized as a PLC. The control device 100 may be connected to various field instruments 500 via a field network 2. The control device 100 exchanges data with one or more field instruments 500 via the field network 2 and the like. Generally, the term "field network" is also referred to as "field bus" but hereinafter collectively referred to as "field network" in the description for simplicity. That is, the "field network" in the description is a concept that covers the "field bus", in addition to the "field network" in a narrow sense.

In an embodiment, a bus or network performing fixed period communication that guarantees the arrival time of data is adopted as the field network 2. EtherCAT (registered trademark), EtherNet/IP (registered trademark), DeviceNet (registered trademark), CompoNet (registered trademark), etc. are known as such a bus or network that guarantees the arrival time of data.

An arbitrary field instrument 500 can be connected to the field network 2. The field instrument 500 includes an actuator providing some kind of physical action to a manufacturing apparatus, a production line and the like (also collectively referred to as "field" hereinafter), an input/output apparatus that exchanges information with the field, etc.

Data is exchanged between the control device 100 and the field instruments 500, and the data being exchanged is updated at a very short cycle of an order of several hundreds of μsec to an order of several tens of msec. Such data exchange includes processing to transmit data collected or generated in the field instruments 500 (also referred to as "input data" hereinafter) to the control device 100 and processing to transmit data such as a control command for the field instrument 500 (also referred to as "output data" hereinafter) from the control device 100. Such update processing of data being exchanged corresponds to the "input/output refresh processing", which is described later.

In the configuration example shown in FIG. 2, the field instruments 500 include a remote I/O (Input/Output) apparatus 510, a robot 520, a robot controller 522, a NC machining tool 530, a servo driver 540, and a servo motor 542.

The servo motor 542 drives a conveyer 544 and conveys a work W to a work table 546 disposed in front of the NC machining tool 530. The robot 520 arranges the untreated work W on the work table 546 inside the NC machining tool 530, takes out the work W already treated by the NC machinery tool 530, and arranges the treated work W on the work table 546.

The field instruments 500 are not limited to the aforementioned apparatuses. An arbitrary device that collects the input data (for example, a visual sensor, etc.) and an arbitrary device that provides some kind of actions according to the output data (for example, an inverter device, etc.), etc. can be adopted as the field instrument 500.

The remote I/O apparatus 510 typically includes a communication coupler that communicates via the field network 2 and an input/output unit (also referred to as "I/O unit" hereinafter) for retrieving the input data and outputting the output data.

The remote I/O apparatus 510 is connected with apparatuses that collect the input data, such as an input relay and various types of sensors (for example, an analog sensor, a temperature sensor, a vibration sensor, etc.) and apparatuses that provides some kinds of actions to the field such as an output relay, a contactor, a servo driver and other arbitrary actuator.

The robot controller 522 performs trajectory calculation and angle calculation for each axis according to the control command (a position command, a speed command, etc.) from the control device 100, and drives the servo motor, etc. constituting the robot 520 according to the calculation result.

The servo driver 540 drives the servo motor 542 according to a control command (for example, a position command, a speed command, etc.) from the control device 100.

The control device 100 may be connected to other apparatuses via a host network 6. Ethernet (registered trademark) or EtherNet/IP (registered trademark), which is a general network protocol, may be adopted as the host network 6. More specifically, one or more server apparatuses 300 and one or more display apparatuses 400 may be connected to the host network 6.

A database system, a manufacturing execution system (MES), etc. are assumed as the server apparatus 300. The manufacturing execution system obtains information from a production apparatus or facility to be controlled so as to monitor and manage the entire production, and also can handle order information, quality information, shipment information, etc. Moreover, an apparatus that provides the information system service may be connected to the host network 6. Processing that obtains information from the production apparatus or facility to be controlled and performs macro or micro analysis is assumed as the information system service. For example, data mining that extracts some kind of characteristic tendency included in the information from the production apparatus or facility to be controlled, and a machine learning tool for performing machine learning based on the production apparatus or facility to be controlled are assumed.

The display device 400 accepts an operation from a user and outputs a command corresponding to the user operation to the control device 100, and graphically displays a result of calculation in the control device 100, etc.

Further, the control device 100 can be connected to a support apparatus 200. The support apparatus 200 is an apparatus that supports preparation required for the control device 100 to control the control target. Specifically, the support apparatus 200 provides a development environment (a programming and editing tool, a parser, a compiler, etc.) for a program to be executed in the control device 100, a setting environment for setting parameters (configuration) of the control device 100 and various devices connected to the control device 100, a function to output a generated user program to the control device 100, a function to correct or modify a user program, etc. executed in the control device 100 online, etc.

C. Hardware Configuration Example of Control Device

Figure 3:
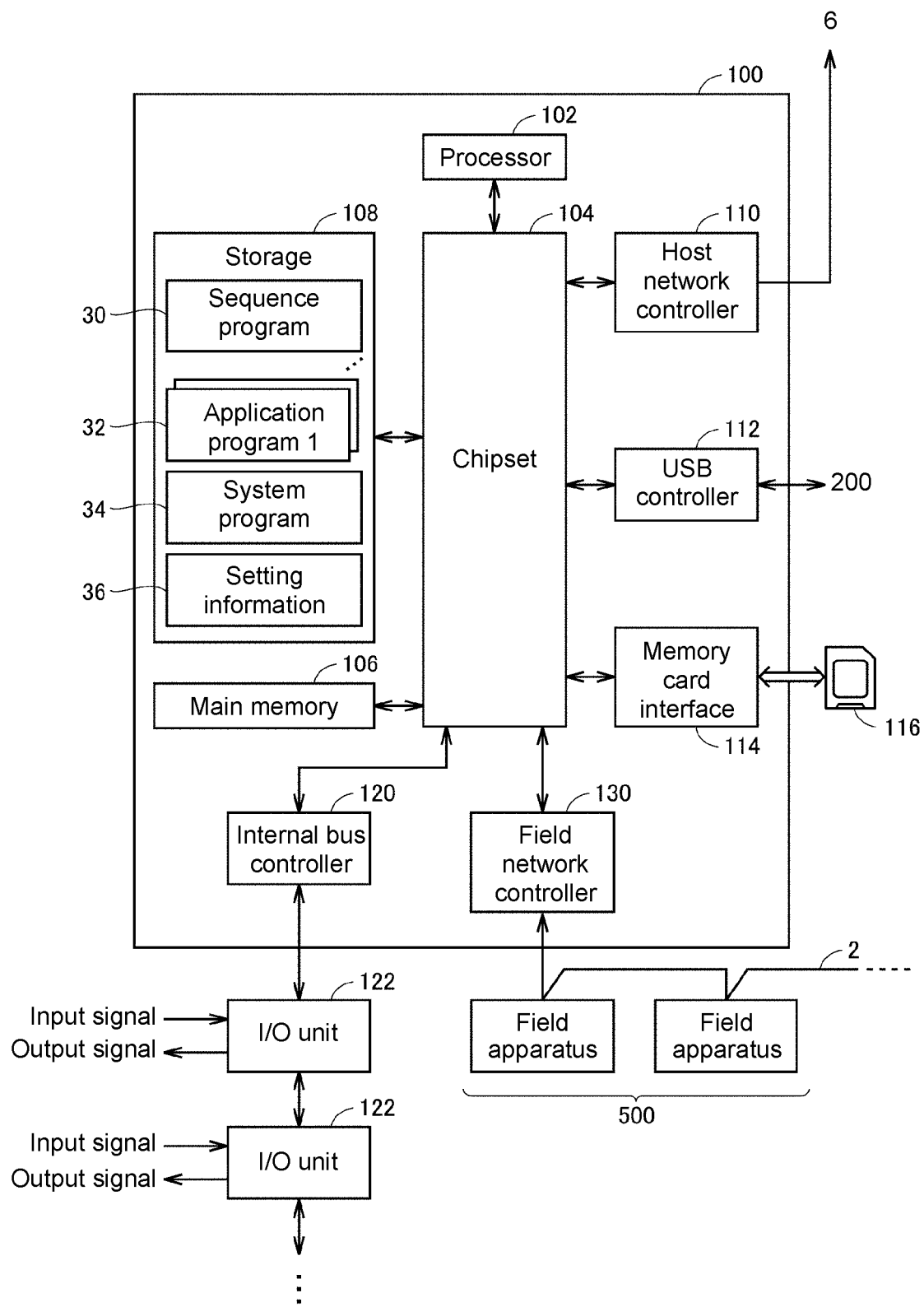
FIG. 3 is a block diagram illustrating an example of the hardware configuration of the control device according to the embodiment.

Next, an example of the hardware configuration of the control device 100 according to the embodiment is described. FIG. 3 is a block diagram illustrating an example of the hardware configuration of the control device 100 according to the embodiment.

Referring to FIG. 3, the control device 100 is an arithmetic processing part referred to as a CPU unit, and includes a processor 102, a chipset 104, a main memory 106, a storage 108, a host network controller 110, a USB (Universal Serial Bus) controller 112, a memory card interface 114, an internal bus controller 120 and a field network controller 130.

The processor 102 comprises a CPU (Central Processing Unit), a MPU (Micro Processing Unit), a GPU (Graphic Processing Unit), etc. As the processor 102, a configuration having multiple cores may be adopted, or multiple processors 102 may be disposed. That is, the control device 100 has one or more processors 102 and/or a processor 102 having one or more cores. The chipset 104 realizes processing of the entire control device 100 by controlling the processor 102 and peripheral elements. The main memory 106 comprises a volatile storage device such as a DRAM (Dynamic Random Access Memory) or a SRAM (Static Random Access Memory). The storage 108 is configured with a non-volatile storage device such as a HDD (Hard Disk Drive) or a SSD (Solid State Drive).

The processor 102 realizes controls according to a control target and various processings described later by reading various programs stored in the storage 108, developing the programs on the main memory 106, and executing the programs. The storage 108 stores a sequence program 30 and one or more application programs 32 (collectively referred to as "user programs") created according to a production apparatus or facility to be controlled in addition to a system program 34 for realizing basic functions. That is, the storage 108 corresponds to a storage part storing the sequence program 30 and the multiple application programs 32 to be sequentially executed.

The host network controller 110 controls data exchange with the server apparatus 300 or the display apparatus 400 (refer to FIG. 3), etc. via the host network 6. The USB controller 112 controls data exchange with the support apparatus 200 via a USB connection.

The memory card interface 114 is configured so that a memory card 116 can be attached or detached. The memory card interface 114 can write data to the memory card 116 and read various data (user programs, trace data, etc.) from the memory card 116.

The internal bus controller 120 controls data exchange with I/O units 122 that are attached to the control device 100. The field network controller 130 controls the data exchange between field devices via the field network 2.

FIG. 3 shows an example of the configuration in which required functions are provided by the processor 102 executing programs, but a part of or all the provided functions may be implemented by using a dedicated hardware circuit (for example, ASIC, FPGA, etc.). Alternatively, the main part of the control device 100 may be realized using hardware according to a generic architecture (for example, an industrial personal computer based on a general purpose personal computer). In this case, multiple OSs (Operating Systems) for different purposes may be executed in parallel by using a virtualization technology, and a necessary application may be executed on each of the OSs.

In the control system 1 illustrated in FIG. 2, the control device 100, the support apparatus 200 and the display apparatus 400 are constituted as separate entities, but a configuration in which a part of or all these functions are integrated into a single apparatus may be adopted.

D. Functional Configuration Example of Control Device

Figure 4:
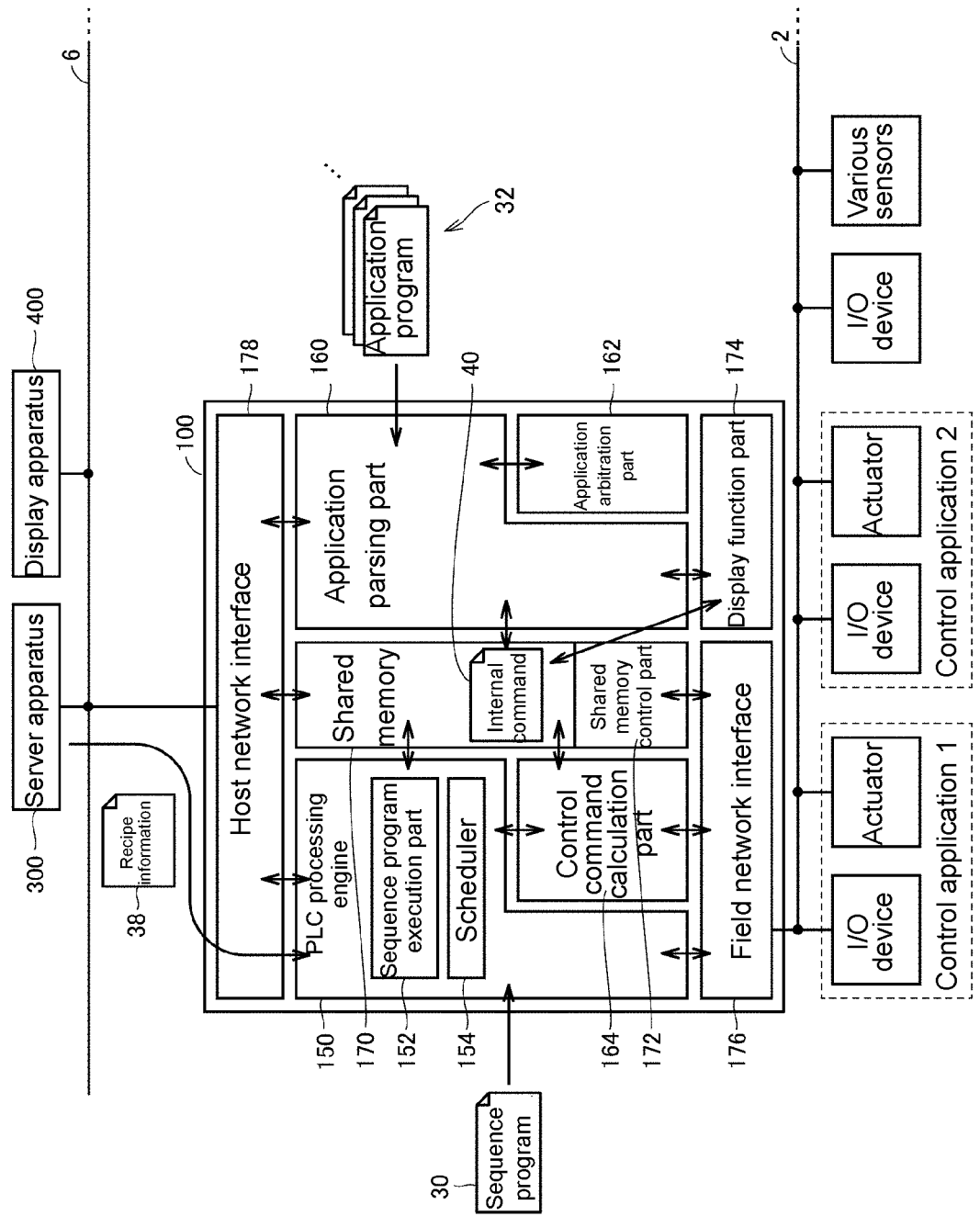
FIG. 4 is a block diagram illustrating an example of the functional configuration of the control device according to the embodiment.

Next, an example of the functional configuration of the control device 100 according to the embodiment is described. FIG. 4 is a block diagram illustrating an example of the functional configuration of the control device 100 according to the embodiment.

FIG. 4 shows a configuration example in which the control device 100 controls a control application 1 and a control application 2. Each of the control applications 1 and 2 typically includes various actuators such as a servo motor and an I/O device such as a relay or a contactor. In addition to the control applications 1 and 2, other I/O devices and various sensors are also connected to the control device 100 via the field network 2.

The control device 100 receives instructions such as the start and the end of the production from a server apparatus 300, etc. connected via the host network 6. The server apparatus 300 may transmit recipe information 38 (information such as a production type and parameters suitable for production) to the control device 100. The control device 100 may be connected to other control devices 100 that are not depicted via the network.

Referring to FIG. 4, the control device 100 includes a PLC processing engine 150, an application parsing part 160, an application arbitration part 162, a control command calculation part 164, a shared memory 170, a shared memory control part 172, a display function part 174, a field network interface 176, and a host network interface 178.

The PLC processing engine 150 manages execution of the sequence program 30 and processing of the entire control device 100. More specifically, the PLC processing engine 150 includes a sequence program execution part 152 and a scheduler 154.

The sequence program execution part 152 executes (scans) the sequence program 30 and outputs a control command at every control cycle.

The scheduler 154 arbitrates the order of processings executed in the control device 100. In the control device 100, one or more processings are registered as a "task", and the scheduler 154 allocates processor resources to one or more tasks based on a predetermined priority.

The application parsing part 160 parses at least a part of the application program 32 and generates an internal command 40. A different type of the application program 32 may be provided to the application parsing part 160. The application parsing part 160 may execute the application program 32 stored in advance, or may execute the application program 32 properly transmitted from the server apparatus 300.

For example, when the application parsing part 160 processes two application programs (the first and second application programs), the application parsing part 160 parses at least a part of the first application program and sequentially generates the first internal command at every application execution cycle which is the same as the control cycle or is longer than the control cycle, and parses at least a part of the second application program and sequentially generates the second internal command at every application execution cycle which is the same as the control cycle or is longer than the control cycle.

The control command calculation part 164 calculates a control command at every control cycle according to a motion instruction included in the sequence program 30. Also, the control command calculation part 164 calculates a control command at every control cycle according to the internal command 40 sequentially generated for each application program by the application parsing part 160.

The sequence program execution part 152 and the control command calculation part 164 perform processing at every control cycle (high priority tasks). On the other hand, the processing for the application program 32 by the application parsing part 160 is performed at every application execution cycle T2 (the second cycle) that is a positive multiple of the control cycle (low priority tasks).

When multiple application programs 32 are processed by the application parsing part 160, the application arbitration part 162 arbitrates the execution timing and the like thereof. Details of the processing by the application arbitration part 162 are described later.

The shared memory 170 holds data that is shared among the PLC processing part 150, the application parsing part 160 and the control command calculation part 164. The shared data may be stored as structured variables. For example, the internal commands 40 sequentially generated by the application parsing part 160 is sequentially written in a structural variable of the shared memory 170. That is, the shared memory 170 stores the internal commands for each application generated by the application parsing part 160.

The shared memory control part 172 performs exclusive control for data reading and data writing of the shared memory 170 and accesses the shared memory 170 according to requests from outside. For example, the shared memory 172 provides data on the shared memory 170 to the field network interface 176 so that the data is transmitted to an arbitrary field instrument 500 connected via the field network 2.

The display function part 174 outputs data stored in the shared memory 170 and processing results by the application parsing part 160, etc. to the user, etc.

The field network interface 176 mediates data exchange with the field instruments 500 connected via the field network 2.

The host network interface 178 mediates data exchange with apparatuses connected via the high level network 6.

E. Example of Internal Command

Next, an example of the internal command 40 generated by parsing the application program 32 by the application parsing part 160 of the control device 100 is described. Any program that is described in an arbitrary language executable by the interpreter system can be adopted as the application program 32, but in this description, a program that defines a trajectory in advance by one or more commands, such as a NC program or a robot program, is assumed.

Figure 5A:
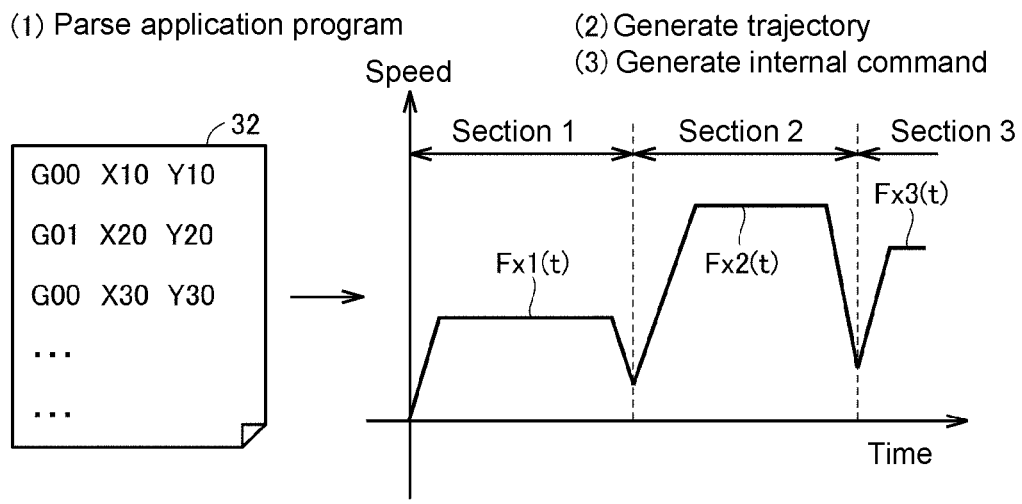
FIGS. 5A and 5B are schematic diagrams for describing the internal command generation processing in the control device according to the embodiment.
Figure 5B:
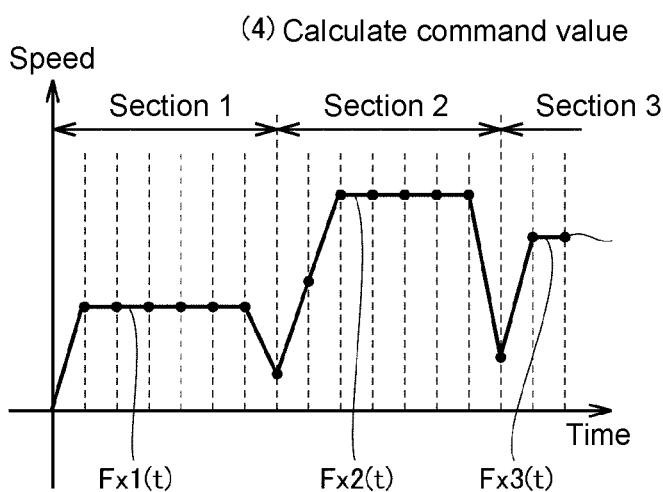

FIGS. 5A and 5B are schematic diagrams for describing the generation processing of the internal command 40 in the control device 100 according to the embodiment. Referring to FIG. 5A, the application parsing part 160 parses the application program 32, so as to parse each instruction included in the application program 32 ((1) Application program parsing). By parsing the application program 32, a defined trajectory is internally generated ((2) Trajectory generation). Since the application program 32 often includes instructions specifying a trajectory for every section, a trajectory is generated for each section corresponding to each of the instructions.

When a group composed of multiple axes is defined, a trajectory may be generated for each axis, or a trajectory defining the motion of the entire axes belonging to the group may be generated.

The application parsing part 160 generates the internal command 40 (typically, one or more functions) indicating the generated trajectory ((3) Internal command generation). When the trajectory is defined for each section, the internal command 40 corresponding to each of the sections is generated.

As described above, the application parsing part 160 calculates passing points on a trajectory by parsing the application program 32, and generates an internal command based on the calculated passing points.

Multiple sections may be defined by a common internal command 40. Alternatively, a section may be further divided and separate internal commands 40 may be respectively generated. That is, it is not necessary to match the sections of the trajectory defined by the instruction of the application program 32 or the commands thereof and the number of the internal commands 40 generated, so the internal command 40 can be arbitrary generated. Also, the output form of the internal command 40 may be appropriately designed by considering the time width of the required control cycle.

As shown in FIG. 5A, an example of the internal command 40 may be a function defining the relationship between time and command values. In the example shown in FIG. 5A, the trajectory internally generated can be defined by a combination of straight lines. As an example, regarding the X axis, the trajectory of each straight line section (section 1 to section 3) can be output as Fx1(t), Fx2(t) and Fx3(t) indicating the relationship between time and speed. For the other axes belonging to the same group (Y axis and Z axis), functions may be output in the same way.

As shown in FIG. 5B, the control command calculation part 164 calculates a control command according to the internal command 40 generated at every control cycle so that the control command is output at every control cycle ((4) Command value calculation). That is, by inputting the time of each control cycle to the function corresponding to each of the sections, the command value at the time can be uniquely determined. In the case where any group is set, in an embodiment, the command value for each of the axes belonging to the group are synchronously output.

In FIGS. 5A and 5B described above, an example of a command written in G language used in the CNC is shown as an example, but it is not limited thereto. Any language may be used for programs executed by an arbitrary interpreter system. Also, the format of the internal command 40 to be generated may be altered according to the language format of the processing target.

F. Timing of Processing Execution in Control Device

Figure 6:
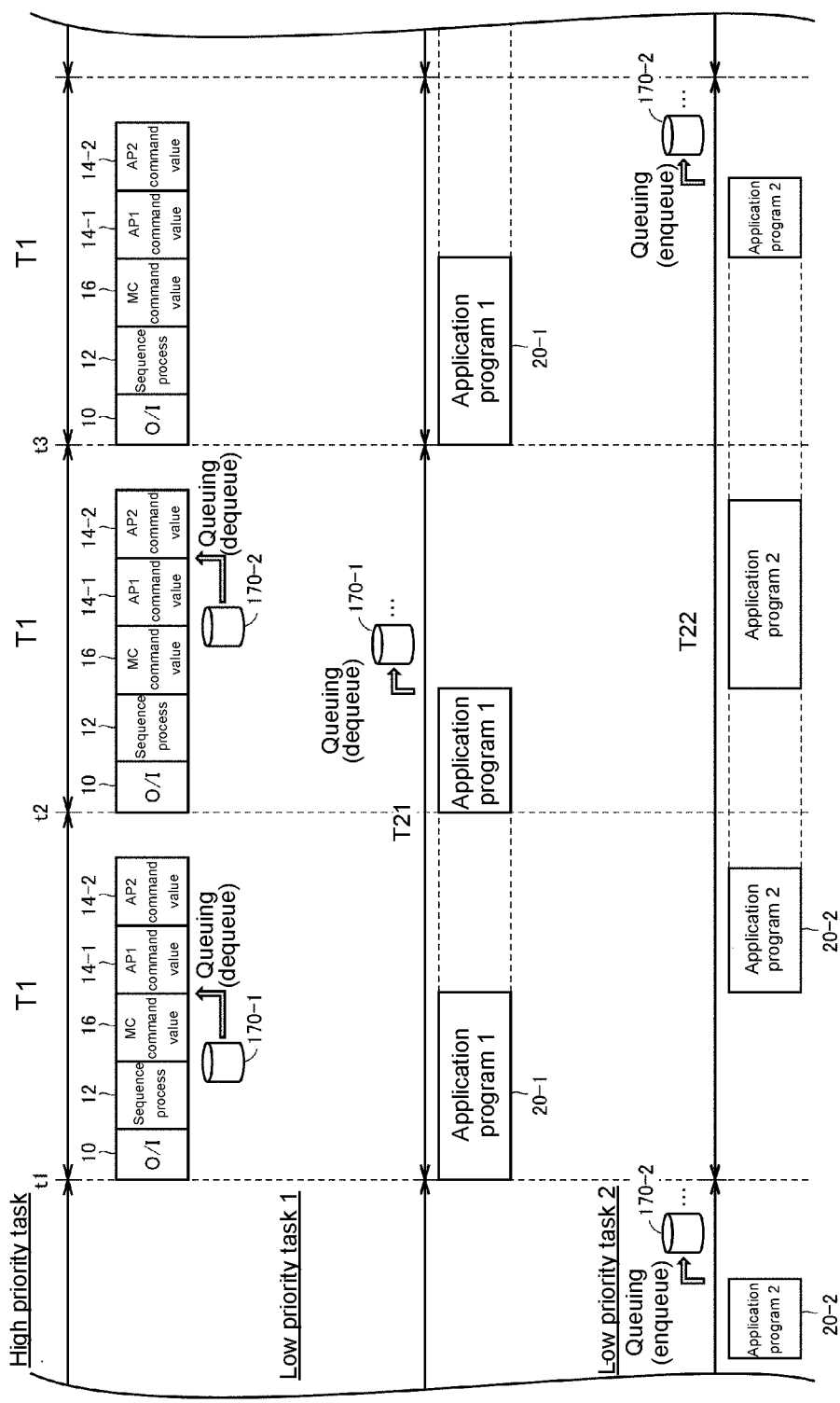
FIG. 6 is a time chart illustrating an example of the timing of processing execution in the control device according to the embodiment.

Next, the timing of the processing execution in the control device 100 according to the present embodiment is described. FIG. 6 is a time chart illustrating an example of the timing of the processing execution in the control device 100 according to the present embodiment. The time chart shown in FIG. 6 illustrates an example in which the control device 100 parses the application program 1 at every application execution cycle T21 and parses the application program 2 at every application execution cycle T22.

Referring to FIG. 6, an input/output refresh process 10, an output process 12 of a control command according to a sequence instruction included in the sequence program, an output process 16 of a control command according to a motion instruction included in the sequence program, an output process 14-1 of a control command according to the application program 1, and an output process 14-2 of a control command according to the application program 2 are set as the high priority tasks.

A parsing process 20-1 of the application program 1 and a parsing process 20-2 of the application program 2 are respectively set as a low priority task 1 and a low priority task 2.

The application parsing part 160 (FIG. 4) parses at least a part of the application program 1 and sequentially generates the internal command 40 at every application execution cycle T21 (double the control cycle T1 in the example shown in FIG. 6). The generated internal command 40 is sequentially queued (enqueued) in a buffer 170-1 inside the shared memory 170.

Also, the application parsing part 160 (FIG. 4) parses at least a part of the application program 2 and sequentially generates the internal command 40 at every application execution cycle T22 (three times the control cycle T1 in the example shown in FIG. 6). The generated internal command 40 is sequentially queued (enqueued) in the buffer 170-2 inside the shared memory 170.

Two application parsing parts 160 independent of each other which respectively process the application program 1 and the application program 2 may be arranged.

Processing of each of the low priority tasks need to be completed within the application execution cycle T21 or T22. In the example shown in FIG. 6, since multiple low priority tasks cannot be executed simultaneously, so one of the low priority tasks stands by in an interrupted (suspended) state.

The high priority task is executed at every control cycle T1. In the output processes 14-1 and 14-2 of the control commands according to the application programs, the internal commands 40 generated by the application parsing part 160 are respectively read (dequeued) from the buffers 170-1 and 170-2, and the control command in the corresponding control cycle T1 is calculated.

For convenience of explanation, the case where the application execution cycle T21 is double the control cycle T1 and the application execution cycle T22 is three times the control cycle T1 is shown as an example, but it is not limited thereto. The application execution cycles T21 and T22 can be set as a positive multiple of the control cycle T1 according to the type of the target application program, and also can be set as the same length as the control cycle T1.

G. Access Processing to Shared Memory

Next, the access processing to the shared memory in the control device 100 according to the embodiment is described. As described above, in the control device 100, multiple programs are executed at different execution cycles. All or a part of the data required for executing these programs and the data calculated by executing these programs may be stored in the shared memory 170. The data stored in the shared memory 170 can be mutually referenced among the programs.

An example of the access processing to the shared memory 170 taking into consideration that the execution cycles are not the same is described below.

Figure 7:
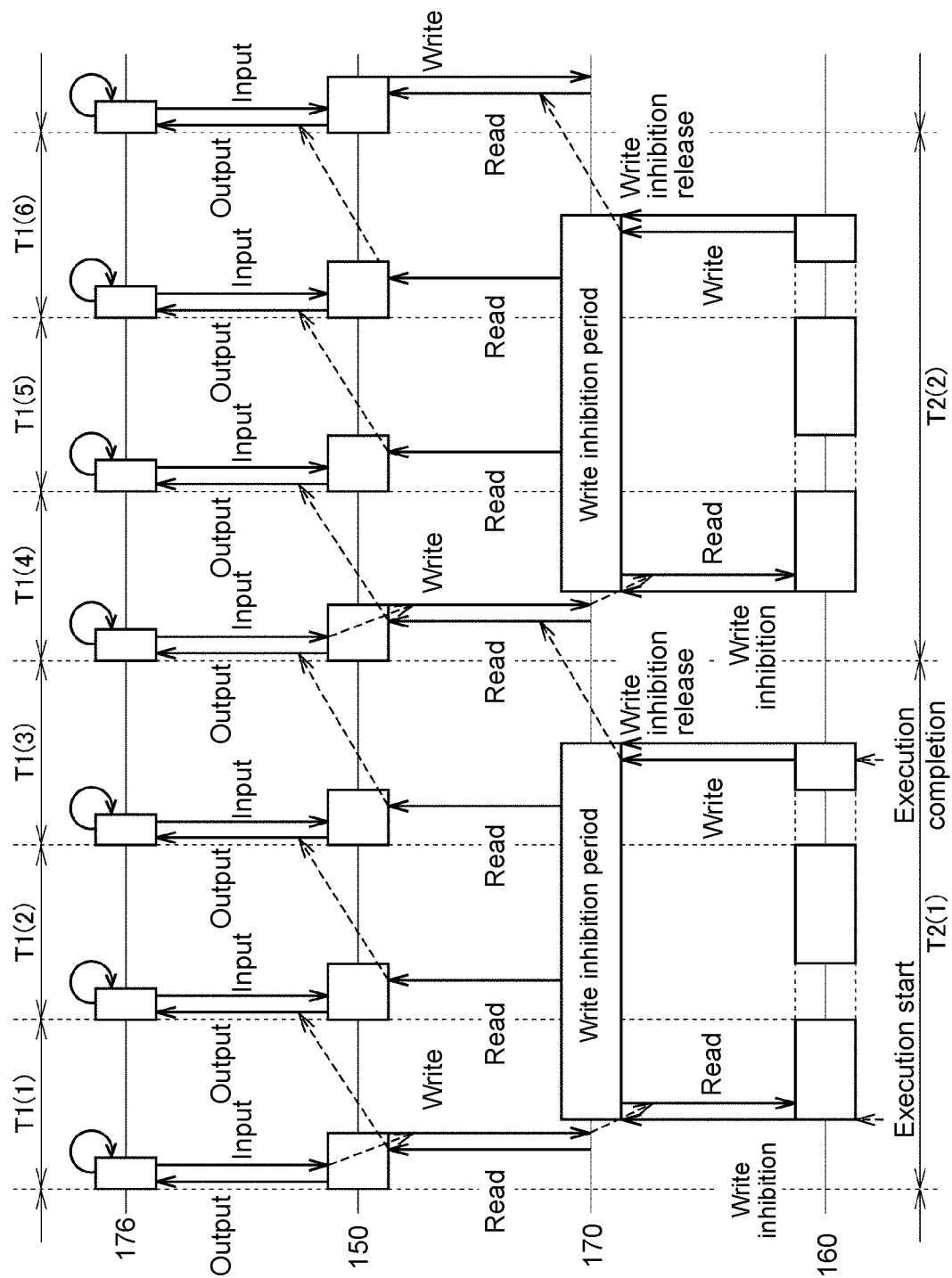
FIG. 7 is a time chart illustrating an example of the access processing to the shared memory of the control device according to the embodiment.

FIG. 7 is a time chart illustrating an example of the access processing to the shared memory 170 of the control device 100 according to the embodiment. In the time chart shown in FIG. 7, a processing example in which the PLC processing engine 150 and the application parsing part 160 access the shared memory 170 is illustrated.

The PLC processing engine 150 cyclically executes the sequence program 30 at every predetermined control cycle T1. At each control cycle T1, the PLC processing engine 150 executes the input/output refresh process with the field network interface 176.

Specifically, the PLC processing engine 150 outputs the control commands (output data) for the field instrument 500 connected via the field network 2 to the field network interface 176 and obtains measured values and status values (input data) from the field instrument 500 via the field network interface 176. The data exchange (input/output refresh process) between the PLC processing engine 150 and the field network interface 176 is repeatedly performed at every control cycle T1. The field network interface 176 exchanges the input data and the output data with the field instrument 500 at every predetermined frame transmission cycle.

Therefore, by the data exchange between the PLC processing engine 150 and the field network interface 176 at every control cycle T1, the output data and the input data can be updated at every predetermined cycle between the PLC processing engine 150 and the field instrument 500.

A part of or all the input data obtained by the PLC processing engine 150 via the field network interface 176 may be written in the shared memory 170. By this write processing, the application parsing part 160 can access the data handled by the PLC processing part 150.

The PLC engine 150 reads required data by accessing the shared memory 170 at every control cycle T1. A part of or all the data read by the PLC processing engine 150 from the shared memory 170 may be output to the field network interface 176 at the next control cycle T1. By this output processing, the data handled by the application parsing part 160 can be output as the control command to the field instrument 500.

In the control device 100 according to the present embodiment, the application parsing part 160 parses the application program 32 at every application execution cycle T2 which is the same as or longer than the control cycle. That is, the application parsing part 160 parses the application program 32 at every predetermined application execution cycle.

To prevent the variable values of the processing target from being altered while the application parsing part 160 is parsing the application program 32, in an embodiment, exclusive processing to the shared memory such as the following is performed.

Specifically, as shown in FIG. 7, at each application execution cycle, when the application parsing part 160 starts performing the processing of the application program 32, the application parsing part 160 sets the write inhibition of the shared memory 170. That is, the application parsing part 160 inhibits writing to the shared memory 170 from the start to the completion of the parse at every application execution cycle. When the area of the shared memory 170 is split and respectively assigned to one of multiple application programs 32, a part of the area assigned to one of the application programs 32 may be set as the target of write inhibition.

During the period in which the write inhibition is set by the application parsing part 160 (write inhibition period), data writing to the area by the PLC processing engine 150 is inhibited. Therefore, the PLC processing engine 150 reads required data from the shared memory 170 before executing the sequence program 30 at each control cycle T1, but does not write the output data such as a control command calculated by executing the sequence program 30 to the shared memory 170.

At the application execution cycle T2, when the parsing process for the application program 32 is completed, the application parsing part 160 writes the data generated by performing the parsing process (typically, the data describing an internal command 40) to the shared memory 170, and then releases the write inhibition of the shared memory 170.

After the write inhibition of the shared memory 170 is released, the PLC processing engine 150 writes data such as a control command calculated by executing the sequence program 30 to the shared memory 170. The data written to the shared memory 170 by the PLC processing engine 150 is read by application parsing part 160 at the next application execution cycle. That is, the application parsing part 160 can refer to the data written to the shared memory 170 by the PLC processing engine 150 at the same control cycle T1. Thereby, the data exchange between the PLC processing engine 150 and the application parsing part 160 completes within the same control cycle T1.

As described above, in the control device 100 according to the embodiment, the processing time (application execution cycle T2) required for the application parsing part 160 to perform a single parse of the application program 32 is the same as the execution cycle (control cycle T1) of the sequence program 30 (sequence instruction and/or motion instruction) or longer than the execution cycle (control cycle T1). In such an execution configuration, to prevent the data such as a control command from the sequence program 30 from being altered, the application parsing part 160 inhibits data writing to the shared memory 170 by others until the process of its own is completed. However, even in the write inhibition period of this data, it is possible to read data (refer to data) from others.

The application parsing part 160 releases the inhibition of data writing to the shared memory 170 at the time of completion of the parsing process at the application execution cycle T2. After the release of the inhibition, data writing to the shared memory 170 by the PLC processing engine 150 becomes possible.

To prevent the information regarding the application program 32 from being altered in the middle of the parsing process of the application program 32, the application parsing part 160 writes the data generated at each application execution cycle T2 to the shared memory 170 after the process is completed.

The data written to the shared memory 170 by the application parsing part 160 is read from the shared memory 170 at the next control cycle T1, and is provided to the field instrument 500 along with the control command based on the sequence program 30 calculated at the same control cycle T1. Therefore, the control command based on the sequence program 30 and the control command based on the application program 32 can be synchronized and provided to the field instrument 500.

H. Program Execution on the Basis of Common Timing—No. 1

Next, an example to realize the program execution on the basis of the common timing for multiple application programs, as shown in FIG. 1 described above, is described.

The entire sequence program 30 is scanned at every control cycle. On the other hand, the application program 32 parses and executes the programs line by line with the interpreter system. In the control device 100 according to the embodiment, the application parsing part 160 parses a certain number of commands included in the application program 32 to some extent (Look Ahead), so the application parsing part 160 can know the existence of the special command in advance.

That is, in the case where the application parsing part 160 performs the Look Ahead operation, when an internal command is generated from a command described in the application program 32, commands that are described after the command from which the internal command is generated are also referred. Therefore, the application parsing part 160 can specify commands (lines) that should be executed on the basis of the timing common among multiple application programs 32 in advance.

As shown in FIG. 1, a special command including a predetermined keyword is described immediately before the line describing a command that should be executed on the basis of the common timing in each of the multiple application programs 32. The execution of commands described after each of the special commands is started after all the application programs are ready to be executed.

In this way, commands of multiple application programs are executed on the basis of the common timing, and control commands, each of which is generated by each of the commands, are concurrently provided to respective control application connected via the common field network 2. Thereby, it is possible to realize the coordinated operation between the NC machining tool and the robot.

Typically, whether or not each of the application programs 32 becomes executable can be managed by the application arbitration part 162.

Figure 8:
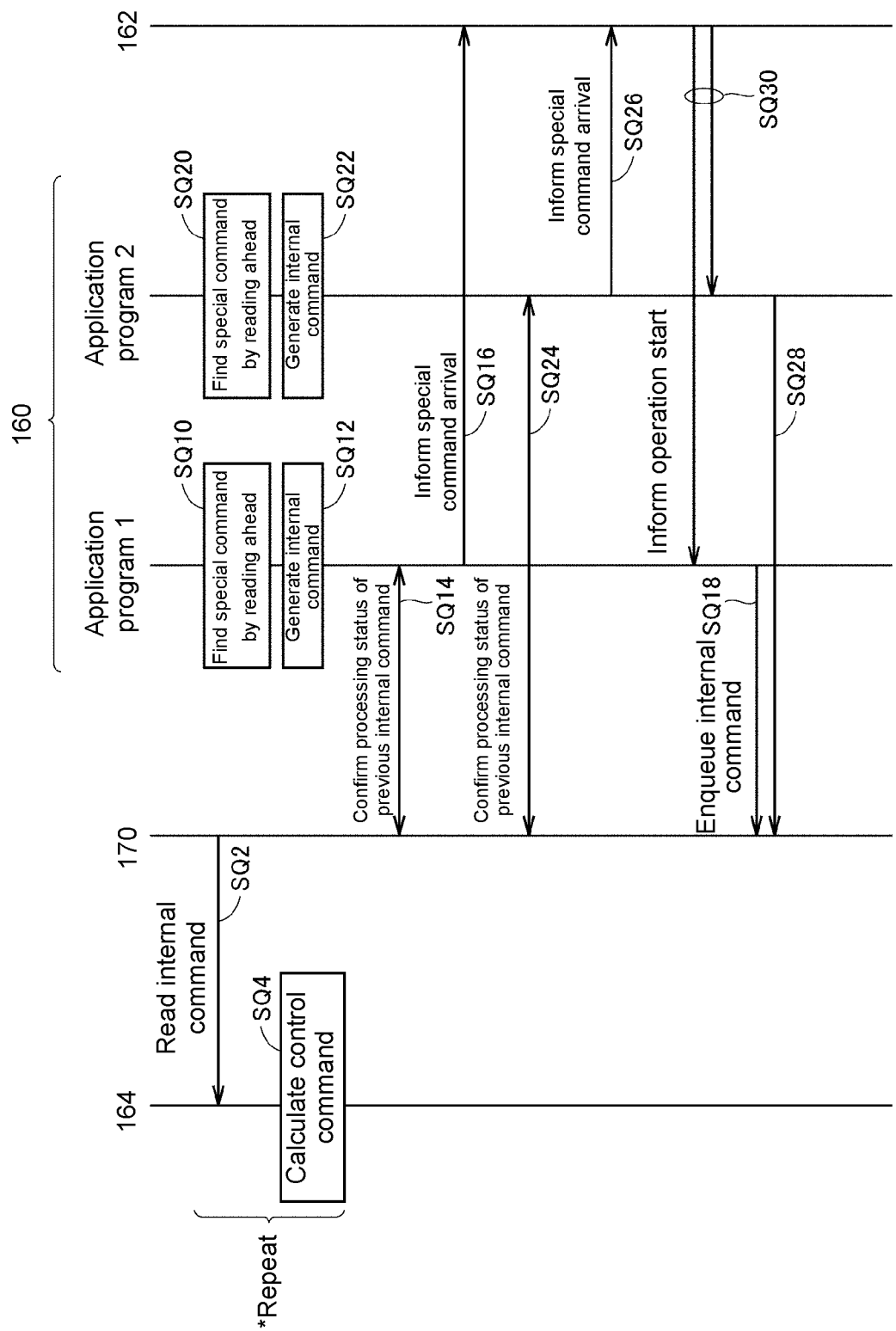
FIG. 8 is a sequence diagram illustrating an example of the program execution on the basis of the common timing in the control device according to the embodiment.

FIG. 8 is a sequence diagram illustrating an example of the program execution on the basis of the common timing in the control device 100 according to the embodiment. In FIG. 8, a case where the control device 100 handles the application program 1 and the application program 2 respectively is illustrated as an example.

Referring to FIG. 8, the control command calculation part 164 reads each of the internal commands sequentially stored in the shared memory 170 (sequence SQ2), and calculates each control command (sequence SQ4). The process of sequence SQ4 is repeated at every control cycle T1. The process of sequence SQ2 is appropriately performed according to the calculation of the control commands based on the internal commands.

When the application parsing part 160 finds a special command by the Look Ahead operation of the parse of the application program 1 (sequence SQ10), the application parsing part 160 generates an internal command based on commands that are described after the special command (sequence SQ12). Then, the application parsing part 160 confirms the processing status of the previous internal command generated based on the commands described before the special command of the application program 1 (sequence SQ14). The confirmation of the processing state of the previous internal command may be realized by referring to the shared memory 170 or by referring to a flag, etc. that indicate the state of the calculation process for the control command in the control command calculation part 164.

When the application parsing part 160 detects the completion of the calculation of the control command based on the previous internal command, the application parsing part 160 notifies the application arbitration part 162 that the processing of the application program 1 has reached the special command (that is, it is possible to start execution) (sequence SQ16).

Similarly, when the application parsing part 160 finds a special command by the Look Ahead operation of the parse of the application program 2 (sequence SQ20), the application parsing part 160 generates an internal command based on commands that are described after the special command (sequence SQ22). Then, the application parsing part 160 confirms the processing status of the previous internal command generated based on the commands described before the special command of the application program 2 (sequence SQ24).

When the application parsing part 160 detects the completion of the calculation of the control command based on the previous internal command, the application parsing part 160 notifies the application arbitration part 162 that the processing of the application program 2 has reached the special command (that is, it is possible to start execution) (sequence SQ26).

When the application arbitration part 162 receives the notification indicating that the execution can be started from both the application program 1 and the application program 2, the application arbitration part 162 transmits an execution start notification of the application program 1 and the application program 2 to the application parsing part 160 (sequence SQ30).

Upon receiving the execution start notification, the internal command already generated in sequence SQ12 and the internal command already generated in sequence SQ22 are queued (enqueued) in the respective buffers inside the shared memory 170 by the application parsing part 160 (sequence SQ18 and SQ28).

The control command calculation part 164 calculates respective control commands by reading (dequeuing) the internal commands from the respective buffers inside the shared memory 170.

As described above, the application arbitration part 162 detects the execution completion of commands up to the one described immediately before the special command of the application program 1 and the execution completion of commands up to the one described immediately before the special command of the application program 2, and notifies the application parsing part 160 of the common timing.

By the internal processing like above, the program execution on the basis of the common timing can be realized.

Figure 9:
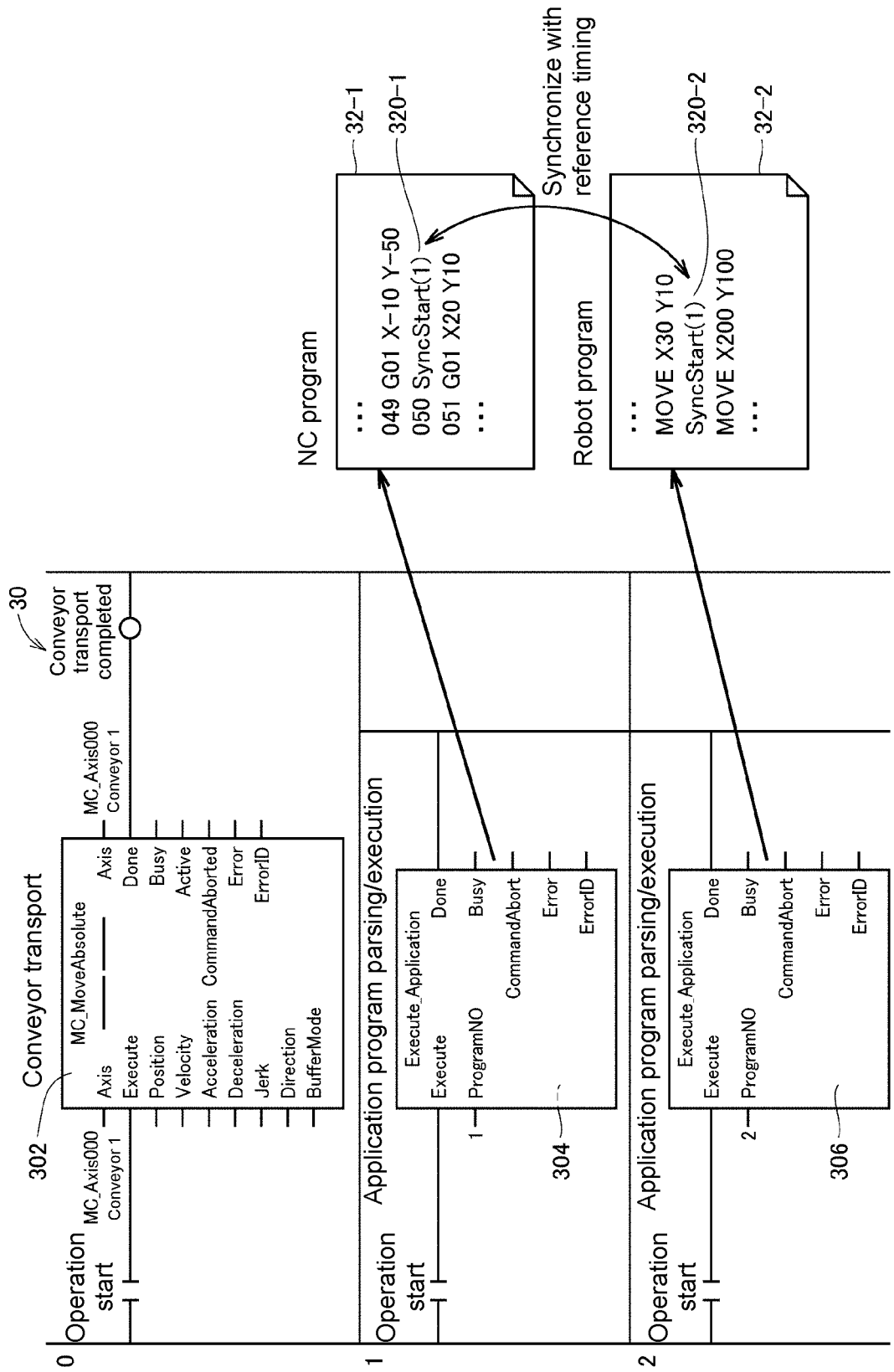
FIG. 9 is a schematic diagram illustrating an example program for realizing program execution on the basis of the common timing in the control device according to the embodiment.

FIG. 9 is a schematic diagram illustrating an example program for realizing the program execution on the basis of the common timing in the control device 100 according to the embodiment. The sequence program 30 shown in FIG. 9 is directed to the control of the conveyer 544, the NC machining tool 530 and the robot 520 shown in FIG. 2.

The sequence program 30 shown in FIG. 9 includes a function block 302 that defines the motion instruction for controlling the servo motor 542 driving the conveyer 544, a function block 304 that instructs the execution start of the application program 32-1 (the NC program) for controlling the NC machining tool 530, and a function block 306 that instructs the execution start of the application program 32-2 (the robot program) for controlling the robot 520.

Each of the function blocks 302, 304 and 306 performs specified processings when the operation start flag becomes TRUE.

The application program 32-1 and the application program 32-2 include a special command (SyncStart) for the execution on the basis of the common timing. In the application program 32-1 shown in FIG. 9, a special command 320-1 is arranged between the command "G01 X-10 Y-50" and the command "G01 X20 Y10". Also, in the application program 32-2, a special command 320-2 is arranged between the command "MOVE X30 Y10" and the command "MOVE X200 Y100".

An argument "1" is added to the special command 320-1 and the special command 320-2 as a keyword for associating each other. A process of matching the reference timing is executed between the special command 320-1 and the special command 320-2. That is, in addition to the command body (SyncStart), an argument for associating each other is specified to the special command 320-1 and the special command 320-2. Then, the commands described after the special command 320-1 and the commands described after the special command 320-2 are executed on the basis of the common timing.

As shown in FIG. 9, the special commands 320-1 and 320-2 for instructing the reference timing adjustment are arranged immediately before the target command to be executed on the basis of the common timing. The special commands, the argument of which matches ("1" in the example shown in FIG. 9), are determined to be the special commands associated with each other among these special commands. The command described in the next line to these special commands is executed on the basis of the common timing. In the example shown in FIG. 9, the execution of the commands described after the respective special commands are simultaneously started on the basis of the common timing.

In the example shown in FIG. 9, the special command 320-1 and the special command 320-2 corresponds to instructions for outputting the control command according to the commands described after the special command 320-1 and for outputting the control command according to the commands described after the special command 320-2 simultaneously on the basis of the common timing.

By preparing such a sequence program 30 and application programs 32, it is possible to operate the robot 520 and the NC machining tool 530 on the basis of the common timing, as shown in FIG. 1 described above.

I. Program Execution on the Basis of Common Timing—No. 2

Next, another example for realizing the program execution on the basis of the common timing for multiple application programs, as shown in FIG. 1 described above, is described. In the above description, the example which simultaneously starts the execution of the commands described after the special command on the basis of the common timing is given, but it is not limited thereto. The control command according to one or both of the control commands may be output after each offset time has passed on the basis of the common timing.

Figure 10:
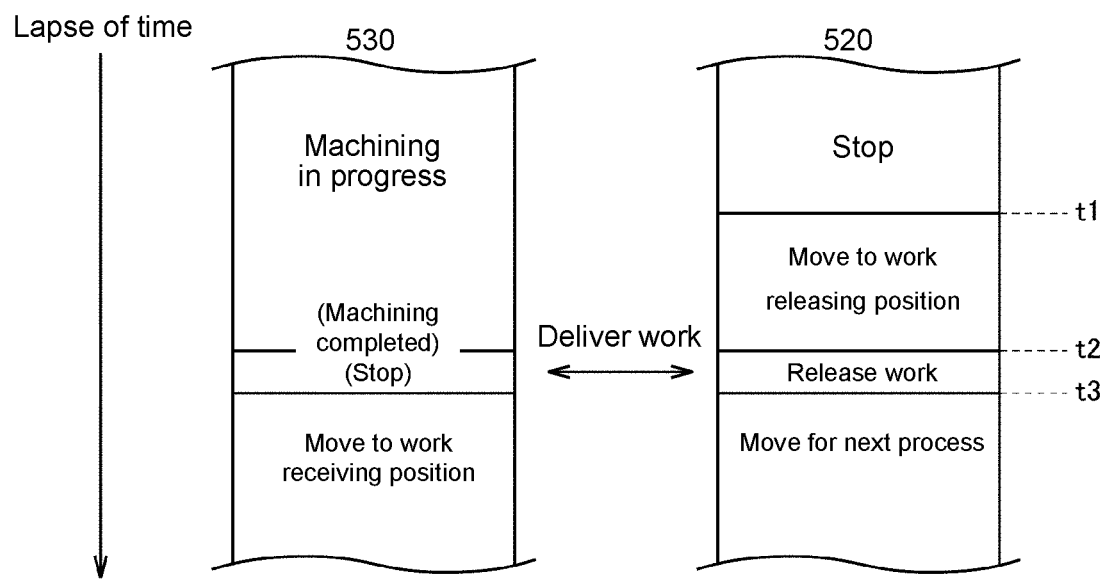
FIG. 10 is a time chart illustrating an example of the control for the robot and the NC machining tool by the control device according to the embodiment.

FIG. 10 is a time chart illustrating an example of the control of the robot 520 and the NC machining tool 530 by the control device 100 according to the embodiment. Referring to FIG. 10, as a typical operation example, the robot 520 picks up a work W that is conveyed by the conveyer 544, and arranges the work W inside the NC machining tool 530. The NC machining tool 530 performs machining of the work W. Then, the robot 520 takes out the work W from the inside of the NC machining tool 530 and arranges the work W on the receiving position for the next process.

FIG. 10 illustrates an operation example immediately before the completion of the machining of the work W in the NC machining tool 530. Assuming that the machining of the work W by the NC machining tool 530 completes at time t2, the robot 520 takes out the work W, machining to which has completed, at time t2. Thus, the robot 520 starts operating at time t1 so as to arrive at the work releasing position of the NC machining tool 530 at time t2. Then, the robot 520 takes out the work W at time t2, and starts moving for the next process at time t3. The NC machining tool 530 starts moving to the pickup position for receiving a new work W immediately after the work W is taken out by the robot 520.

However, during the period of time from the time t2 to the time t3, the NC machining tool 530 stops the operation of its own so as not to interfere the robot 520 since the robot 520 is performing the operation to take out the work W. That is, the robot 520 starts its operation on the basis of the time t2, and the NC machining tool 530 start its operation after stopping its operation for a predetermined period of time based on the time t2.

The period of time from the time t2 to the time t3 shown in FIG. 10 corresponds to an example of the "offset time" described above. By using the special command as described above, operations reflecting such offset time can be realized.

Figure 11:
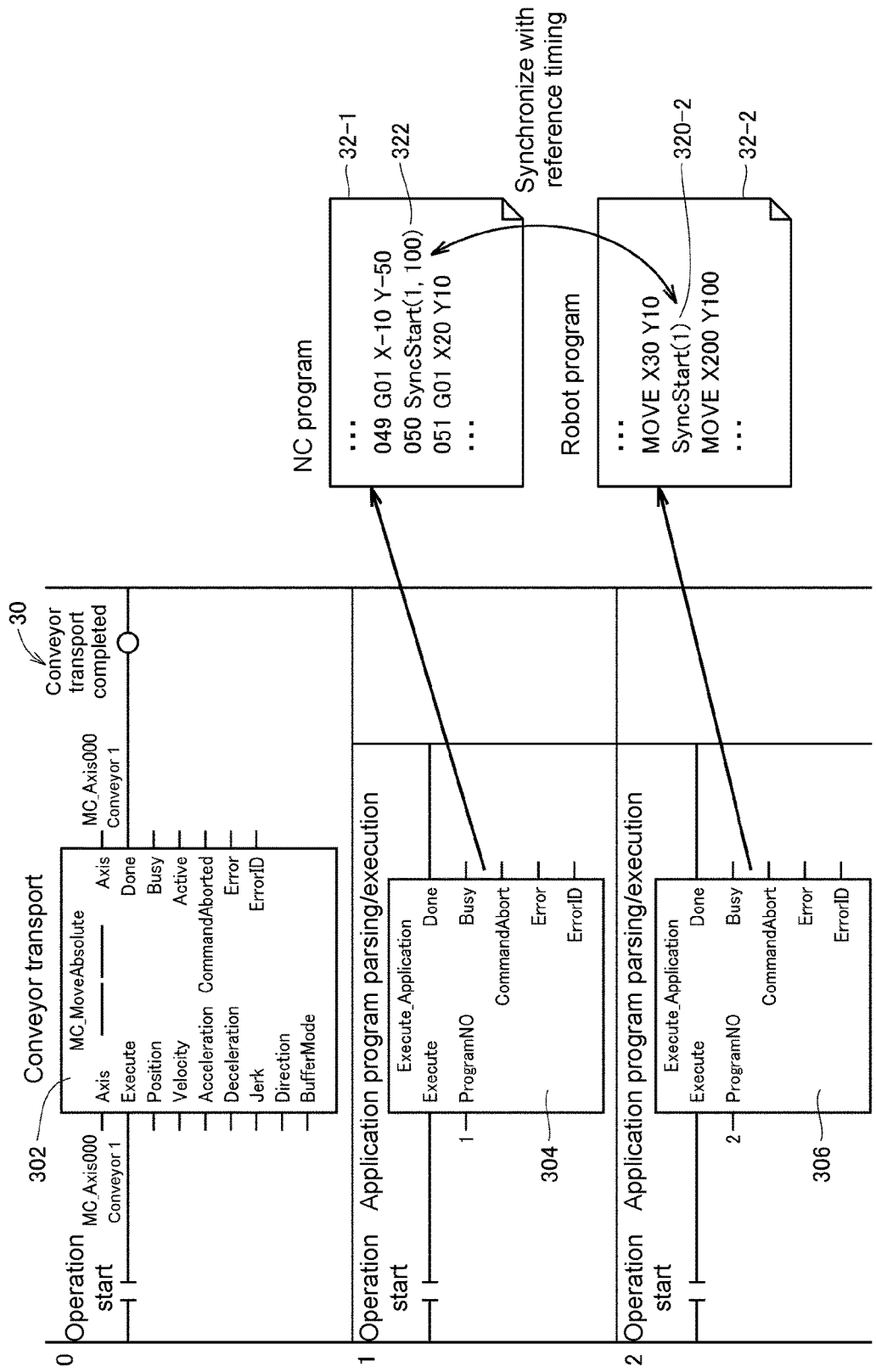
FIG. 11 is a schematic diagram illustrating another example program for realizing program execution on the basis of the common timing in the control device according to the embodiment.

FIG. 11 is a schematic diagram illustrating another program example for realizing program execution on the basis of the common timing in the control device 100 according to the embodiment. The sequence program 30 shown in FIG. 11 is the same as the sequence program 30 shown in FIG. 9, but the special command described in the application program 32-1 (the NC program) called by the sequence program 30 is different.

More specifically, in the application program 32-1, the special command 322 is described instead of the special command 320 of the application program 32-1 shown in FIG. 9.

The first argument "1" for associating the special command 322 with the corresponding special command 320-2 is added to the special command 322. In addition, the second argument "100" that indicates the length of the offset time is added to the special command 322.

As shown in FIG. 11, among the special commands described in each of the application programs 32, the special commands, the value of the argument ("1" in the example shown in FIG. 9) of which matches, are determined as the special commands corresponding to each other. The commands described in the next line to these special commands are executed on the basis of the common timing. However, the execution of the commands described after the special command 322 is started after waiting for the offset time corresponding to the "100" specified as the second argument.

Figure 12:
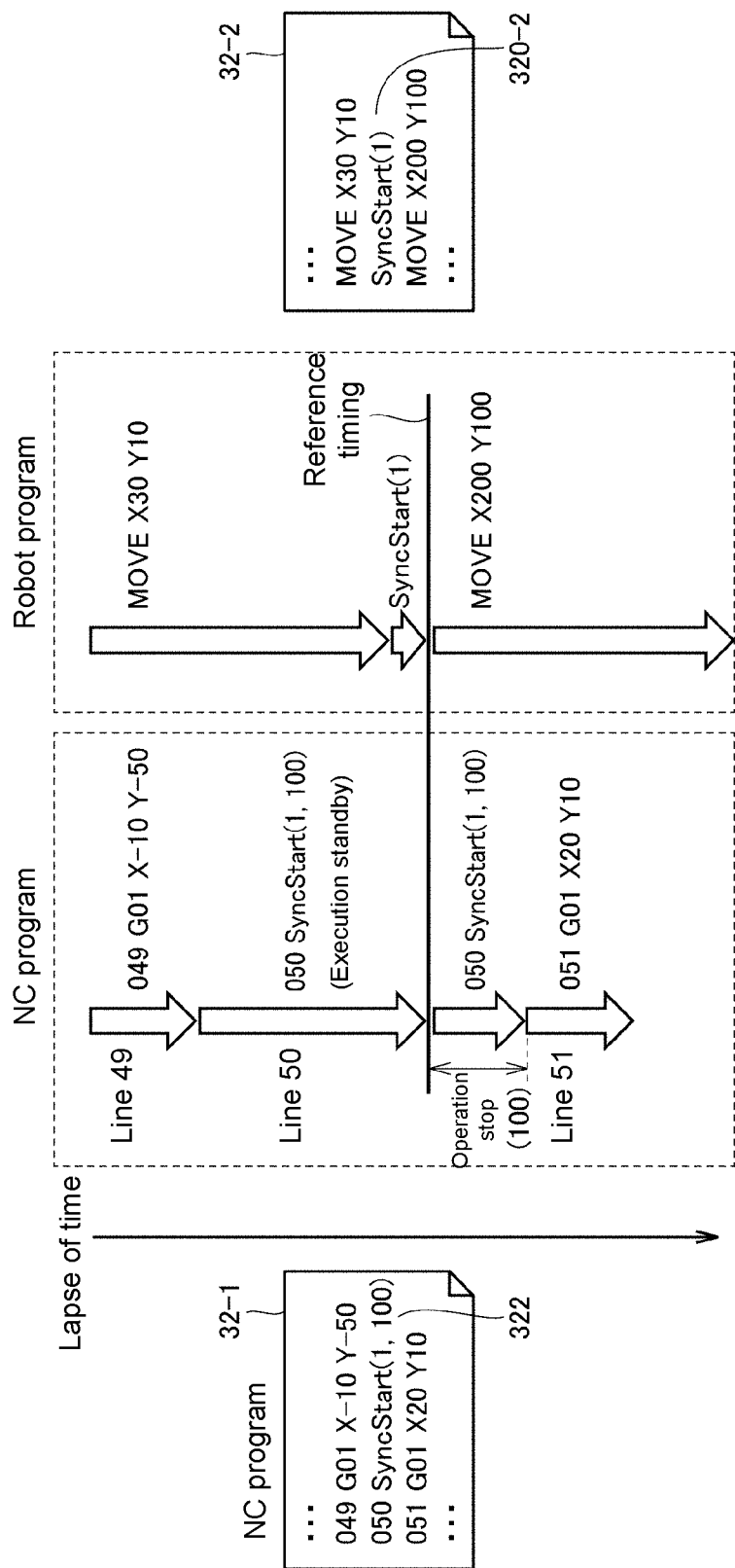
FIG. 12 is a time chart illustrating the program execution corresponding to the example program illustrated in FIG. 11.

FIG. 12 is a time chart illustrating the program execution corresponding to the program example shown in FIG. 11. Referring to FIG. 12, when the execution of the command described immediately before the special command 320-2 is completed, the common timing is set as the reference.

Since the offset time is not set to the special command 320-2 of the application program 32-2, the execution of the commands after the special command 320-2 is started immediately after the reference timing.

On the contrary, the execution of the commands after the special command 322 is started after the specified offset time has passed from the reference timing because the offset time is set to the special command 322 of the application program 32-1.

In the example shown in FIG. 12, the special command 322 corresponds to an instruction for outputting the control commands according to the commands described after the special command 322 after the specified time has passed from the common timing.

As described above, by using a special command including offset time, it is possible to execute multiple applications with maintaining predetermined relative time relationship.

FIG. 11 and FIG. 12 described above illustrate examples in which the offset time is set to one application program only, but it is possible to set the offset time to the special command described in each application program. By setting the offset time to each application program, it is possible to execute multiple application programs with a certain delay, and it is possible to manage various types of control applications in addition to starting execution simultaneously on the basis of the common timing.

J. Synchronize Execution of Multiple Application Programs by Arbitrary Condition Next, synchronized execution of multiple application programs by an arbitrary condition is described. The examples in which the execution of multiple application programs is started on the basis of the common timing by describing the special command in multiple application programs 32 are described above, but it is not limited thereto. It is possible to make the fulfillment of an arbitrary condition be the reference timing.

Figure 13:
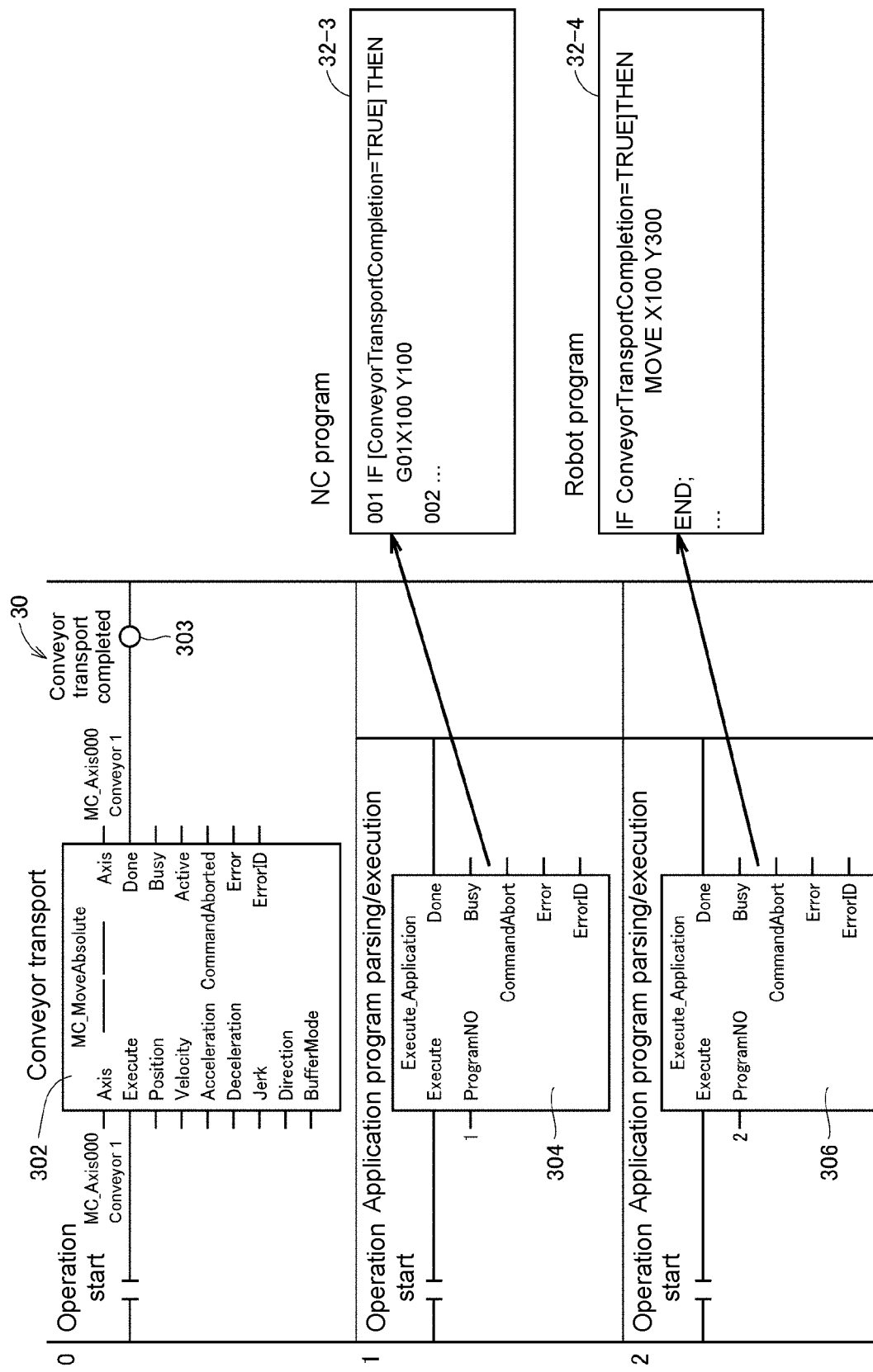
FIG. 13 is a schematic diagram illustrating an example program for synchronized execution of the application programs on the condition of the processing result of the sequence program in the control device according to the embodiment.

FIG. 13 is a schematic diagram illustrating an example program for realizing synchronized execution of application programs on the condition of the processing result of the sequence program in the control device 100 according to the embodiment. The sequence program 30 shown in FIG. 13 includes a function block 302 that defines motion instructions for controlling the servo motor 542 driving the conveyer 544, a function block 304 that instructs the start of the execution of the application program 32-1 for controlling the NC machining tool 530 (NC program), and a function block 306 that instructs the start of the execution of the application program 32-2 for controlling the robot 520 (robot program).

When a control command for the servo motor 542 is provided by the function block 302 and the conveyance of the work W is completed, a coil 303 that indicates the completion of conveyer transportation becomes TRUE. The data (flag value, etc.) updated by such a sequence instruction and/or a motion instruction can be referred to when the application program 32 is parsed.

In the example shown in FIG. 13, a condition "ConveyorTransportCompletion=TRUE" is described in the first line of the application program 32-3 (NC program). That is, the application program 32-3 is executed on the condition that the coil 303 indicating the completion of the conveyer transportation becomes TRUE.

Similarly, in the application program 32-4 (robot program), a condition "ConveyorTransportCompletion=TRUE" is also described. That is, the application program 32-4 is executed on the condition that the coil 303 indicating the completion of the conveyer transportation becomes TRUE.

As shown in FIG. 13, the condition "ConveyorTransportCompletion=TRUE" is described in each of the application programs, and it is possible to set the common timing serving as the reference for the processing execution by this common condition.

As described above, in the control device 100 according to the embodiment, a variable updated by the sequence program 30 can be referred to in the application programs. That is, the application programs 32-3 and 32-4 can specify a variable updated by the sequence program 30 as an execution start condition.

In the example shown in FIG. 13, when the variable "ConveyorTransportCompletion" becomes TRUE, the processing for both the NC program and the robot program is started.

Figure 14:
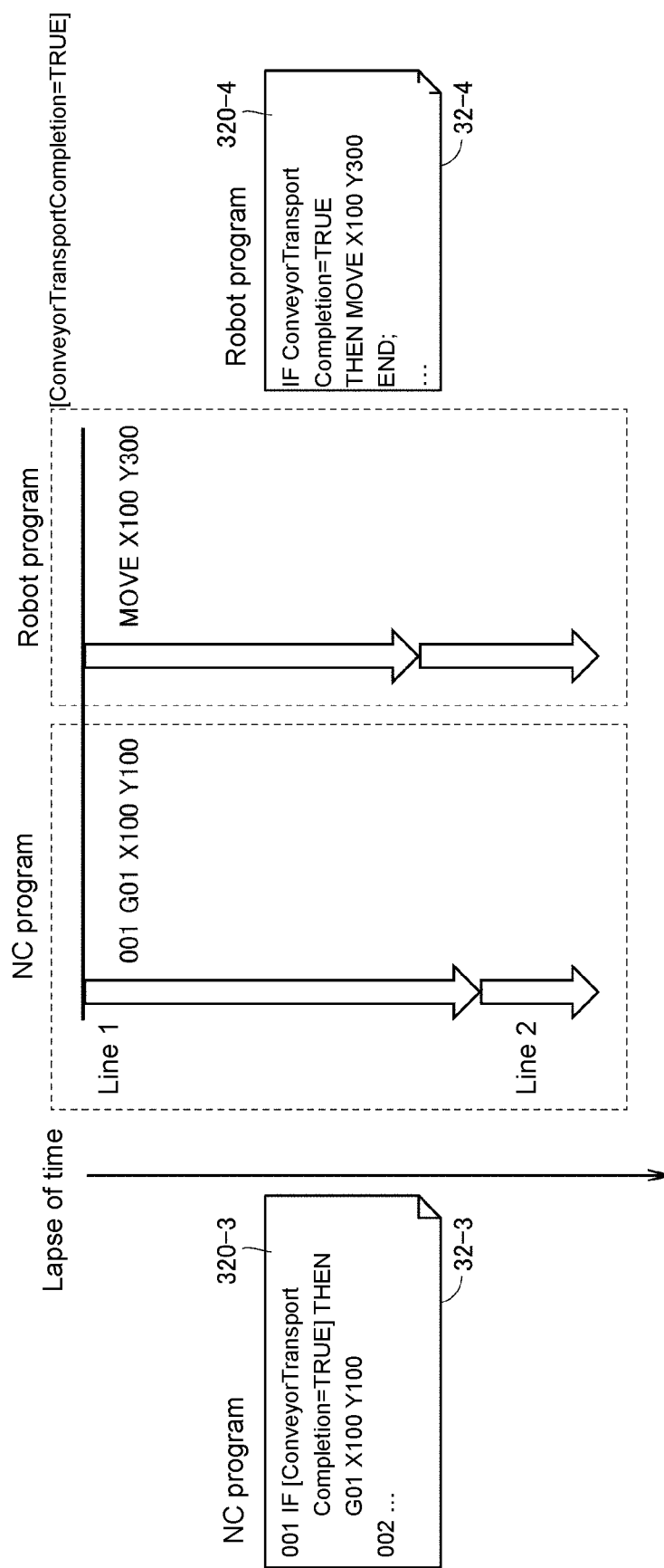
FIG. 14 is a time chart illustrating the program execution of the example program illustrated in FIG. 13.

FIG. 14 is a time chart illustrating program execution corresponding to the program example shown in FIG. 13. Referring to FIG. 14, the timing at which the variable "ConveyorTransportCompletion" becomes "TRUE" is substantially set as the common reference timing. Then, the execution of each command of the application programs 32-1 and 32-2 is started from this common reference timing. In this way, by using a variable in the sequence program, the execution of multiple applications can be started simultaneously on the basis of the common timing.

For convenience for explanation, FIG. 13 and FIG. 14 show the example in which two application programs are started simultaneously, but it is not limited thereto. Three or more applications can be started simultaneously.

The example to simultaneously start multiple applications is shown, but it is also possible to set the offset time as described above. This case is realized by explicitly describing the offset time to wait after the condition defining the reference timing in each application program.

Because the control device 100 according to the embodiment can adopt not only the method to set the common timing by describing the special command in the application programs 32 but also the method to set the common timing by using a variable updated by the sequence program, it is possible to increase the degree of freedom of programming from the program developers' point of view.

K. Display Function Part

Figure 15A:
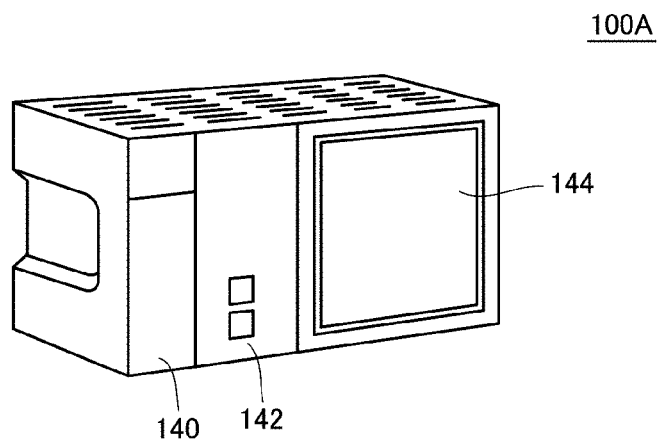
FIGS. 15A and 15B are schematic diagrams illustrating the external appearance of the control devices having a display function part according to the embodiment.
Figure 15B:
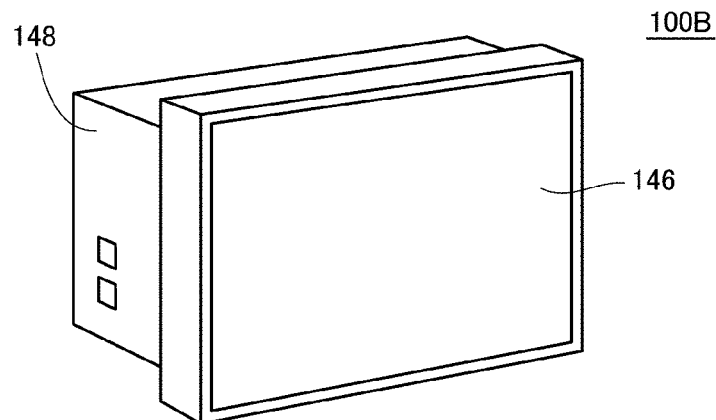

Next, the display function part 174 of the control device 100 according to the embodiment is described. The control device 100 may have a display part that visually presents arbitrary information to the user. The display part may have an input function that accepts operations from the user. FIGS. 15A and 15B are schematic diagrams illustrating the external appearance of the control devices having the display function part according to the embodiment.

Referring to FIG. 15A, a control device 100A includes a power source unit 140, a CPU unit 142, and a display unit 144. The CPU unit 142 provides the same functionality as the control device 100 described above. The display unit 144 includes a display and outputs the results of computation by the CPU unit 142. The display unit 144 may have user input functionality such as a touch panel.

The control device 100A shown in FIG. 15A has the display unit 144 including a relatively small display in the body, and the display unit 144 displays information based on the data in the shared memory 170. The user can confirm the contents of data in the shared memory 170 by the display unit 144.

Referring to FIG. 15B, the control device 100B includes a touch panel 146 and a main body 148, and is configured as an integral type. The touch panel 146 displays the results of computation by the main body 148, and accepts user operations and outputs signals indicating the operation contents to the main body 148. The main body 148 provides the same functionality as the control device 100 described above.

According to the configuration of the control device 100B shown in FIG. 15B, since a relatively large display can be disposed in the main body, it is possible to present not only a display based on the data in the shared memory 170 but also the contents and the execution status of the application programs, etc. Also, the user can edit the application programs by operating the touch panel 146.

Figure 16:
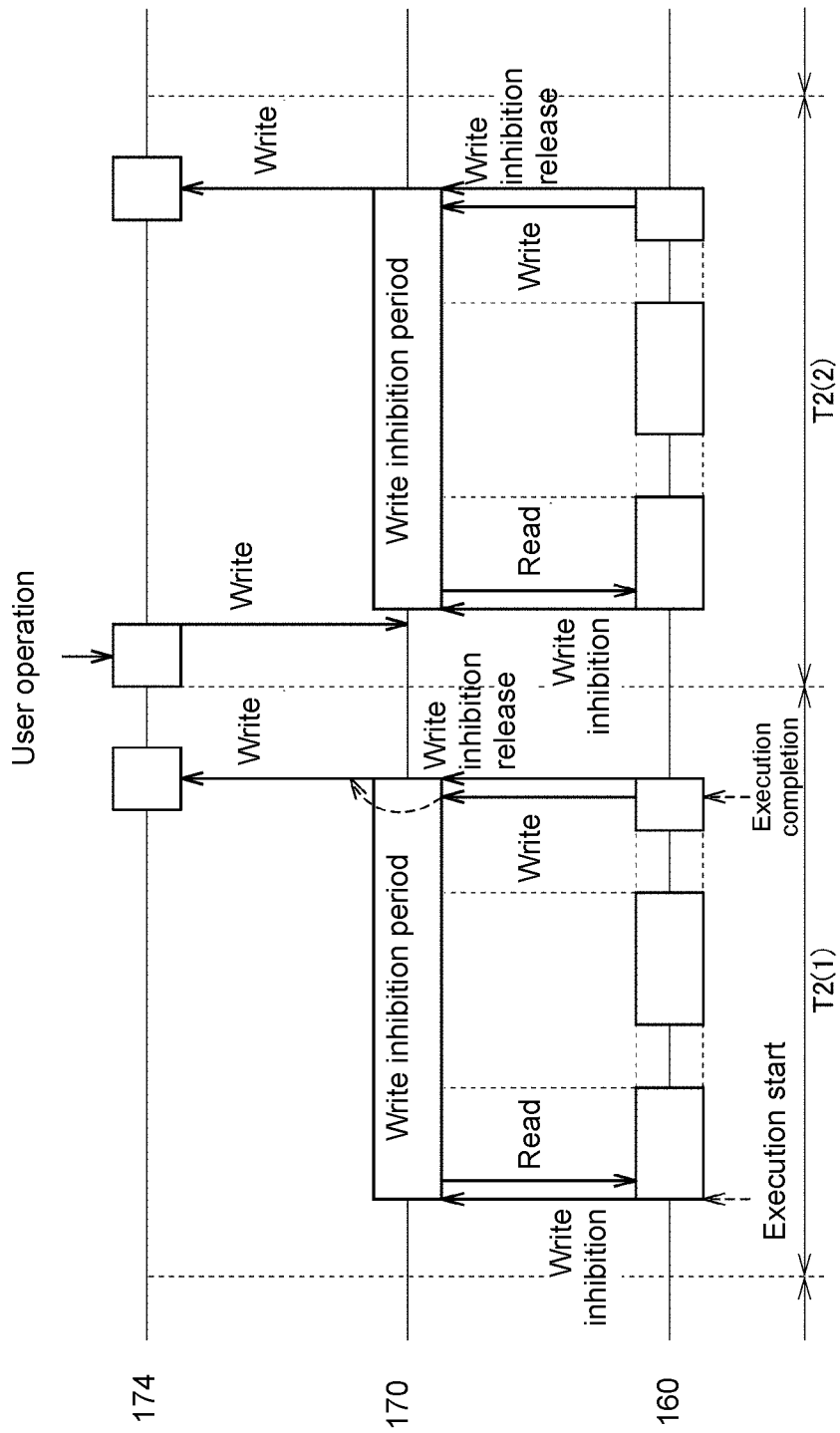
FIG. 16 is time chart illustrating another example of the access processing to the shared memory of the control device according to the embodiment.

FIG. 16 is a time chart illustrating another example of the access processing to the shared memory 170 of the control device 100 according to the embodiment. In the time chart shown in FIG. 16, a processing example in which the display function part 174 and the application parsing part 160 access the shared memory 170 is illustrated.

Referring to FIG. 16, as described above, at every application execution cycle, the application parsing part 160 inhibits writing to the shared memory 170 when the application parsing part 160 starts the processing for the target application program 32. After the write inhibition period is ended, data writing from the shared memory 170 to the display function part 174 is performed.

Also, in the case where an operation from the user is received via the touch panel, etc., the data indicating the operation contents from the user is written to the shared memory 170 at a timing that does not fall within the write inhibition period. Writing to the shared memory may be permitted when a further condition, such as a specified processing is not performed, is satisfied.

As described above, in the control device 100, 100A and 100B according to the embodiment, the display function part 174 can present the processing result or the processing status of the application programs 32 to the user by accessing the shared memory 170, and also enables the user to edit the application programs 32. Thereby, it is possible to enhance the usability when executing the application programs 32.

L. Supplementary Information

The embodiment as described above includes the following technical concepts.

[Configuration 1]

A control device, including:

a storage part (108) that stores a first application program and a second application program (32) sequentially executed and a sequence program (30), wherein each of the first and second application programs (32) includes one or more commands;

a program execution part (152) that executes the sequence program and outputs a control command at every control cycle;

a parsing part (160) that sequentially generates a first internal command by parsing at least a part of the first application program at every first cycle that is the same as or longer than the control cycle, and sequentially generates a second internal command by parsing at least a part of the second application program at every second cycle that is the same as or longer than the control cycle, a shared memory (170) that stores the first and second internal commands generated by the parsing part, and a command calculation part (164) that outputs respective control commands at every control cycle according to the first and second internal commands, wherein when the first application program includes a first special command (320-1; 332), and the second application program includes a second special command (320-2) corresponding to the first special command, the command calculation part outputs control commands according to commands described after the first special command in the first application program and control commands according to commands described after the second special command in the second application program on the basis of a common timing.

[Configuration 2]

The control device according to Configuration 1, further including an arbitration part (162) that detects the completion of the execution of the commands up to the command described immediately before the first special command and the completion of the execution of the commands up to the command described immediately before the second special command, and notifies the parsing part of the common timing.

[Configuration 3]

The control device according to Configuration 1 or 2, wherein the first special command (320-1) and the second special command (320-2) include an instruction for simultaneously outputting the control commands according to the commands described after the first special command and the control commands according to the commands described after the second special command on the basis of the common timing.

[Configuration 4]

The control device according to Configuration 1 or 2, wherein the first special command (322) includes an instruction for outputting the control commands according to the commands described after the first special command after a specified period of time has passed from the common timing.

[Configuration 5]

The control device according to any one of Configurations 1 to 4, wherein a variable (303) that is updated by the sequence program can be specified as an execution start condition for the first application program and the second application program.

[Configuration 6]

The control device according to any one of Configurations 1 to 5, wherein an argument that associates the first special command and the second special command with each other is specified to the first special command and the second special command in addition to a command body.

[Configuration 7]

The control device according to any one of Configurations 1 to 6, wherein the parsing part also refers to the commands described after the command from which the internal command is generated when the parsing part generates the internal commands from the commands described in the first application program and the second application program.

[Configuration 8]

The control device according to any one of Configurations 1 to 7, wherein the parsing part parses the application program at every predetermined execution cycle, and inhibits writing to the shared memory during a period of time that is from the start to completion of the parse at every execution cycle.

M. Advantages

The control device according to the embodiment can execute one or more application programs in parallel in addition to the sequence program including the sequence instruction and the motion instruction. The same control accuracy can be realized regardless of the sequence program or the application programs because the control command according to each of the instructions can be output at every control cycle even in such a parallel execution.

The control device according to the embodiment can synchronize the coordinated operation between control applications controlled by each of the application programs at the control cycle when the multiple application programs are executed in parallel. Alternatively, the control device can perform the coordinated operation by shifting the operation between the control applications by an offset time defined in units of the control cycle. By providing such an accurate coordinated operation, the facilities can be operated efficiently, and thereby the production efficiency can be improved.

The embodiment disclosed herein should be regarded as examples and not restrictive. The scope of the present invention is indicated by the scope of the claims rather than the explanation described above, and intended to include all variations within the meaning and the scope equivalent to the scope of the claims.

What is claimed is:

1. A control device, comprising:
a storage device that stores a sequentially executed first application program and a sequentially executed second application program and a sequence program, wherein each of the sequentially executed first application program and the sequentially executed second application program comprises a plurality of command;
a shared memory; and
a processor, configured to:
execute the sequence program to output a control command at every control cycle,
sequentially generate a first internal command by parsing at least a part of the sequentially executed first application program at every first cycle that is same as or longer than the control cycle, and generate a second internal command by parsing at least a part of the sequentially executed second application program at every second cycle that is same as or longer than the control cycle,
store the first internal command and the second internal command in the shared memory, and
output second control commands at every control cycle according to the first internal command and the second internal command,
wherein
when the sequentially executed first application program comprises a first special command and the sequentially executed second application program comprises a second special command that corresponds to the first special command, the processor outputs a first portion of the second control commands according to first segment commands described after the first special command among the commands in the sequentially executed first application program and a second portion of the second control commands according to second segment commands described after the second special command among the commands in the sequentially executed second application program on the basis of a common timing, and
detects execution completion of third segment commands before the first special command among the commands in the sequentially executed first application program and execution completion of fourth segment commands before the second special command among the commands in the sequentially executed second application program, wherein
when generating the first internal command, the processor also refers to fifth segment commands described after a command from which the first internal command is generated among the commands in the sequentially executed first application program; and
when generating the second internal command, the processor also refers to sixth segment commands described after a command from which the second internal command is generated among the commands in the sequentially executed second application program.

2. The control device according to claim 1, wherein the first special command and the second special command include an instruction for simultaneously outputting the first portion of the second control commands according to the first segment commands described after the first special command and the second portion of the second control commands according to the second segment commands described after the second special command at the common timing.

3. The control device according to claim 1, wherein the first special command comprises an instruction for outputting the first portion of the second control commands according to the first segment commands described after the first special command after a specified period of time has passed from the common timing.

4. The control device according to claim 1, wherein a variable that is updated by the sequence program is specified as an execution start condition for the sequentially executed first application program and the sequentially executed second application program.

5. The control device according to claim 1, wherein an argument that associates the first special command and the second special command with each other is specified in addition to a command body in the first special command and the second special command.

6. The control device according to claim 1, wherein the processor parses the sequentially executed first application program and the sequentially executed second application program at every predetermined execution cycle, and inhibits writing to the shared memory during a period of time that is from start to completion of parse at every execution cycle.

* * * * *